M

(12) United States Patent
Jawidzik et al.

(10) Patent No.: US 10,527,222 B2
(45) Date of Patent: Jan. 7, 2020

(54) LOCKING NUT AND WASHER

(71) Applicant: NOVARTIS AG, Basel (CH)

(72) Inventors: Geoffrey C Jawidzik, Mission Viejo, CA (US); William Monteleone, Aliso Viejo, CA (US)

(73) Assignee: Novartis AG, Basel (CH)

( * ) Notice: Subject to any disclaimer, the term of this patent is extended or adjusted under 35 U.S.C. 154(b) by 232 days.

(21) Appl. No.: 15/668,803

(22) Filed: Aug. 4, 2017

(65) Prior Publication Data

US 2018/0058627 A1    Mar. 1, 2018

Related U.S. Application Data

(60) Provisional application No. 62/381,449, filed on Aug. 30, 2016.

(51) Int. Cl.
*F16M 11/06* (2006.01)
*F16M 13/02* (2006.01)
*F16B 39/24* (2006.01)

(52) U.S. Cl.
CPC ............. *F16M 13/02* (2013.01); *F16B 39/24* (2013.01); *F16M 2200/024* (2013.01); *F16M 2200/06* (2013.01)

(58) Field of Classification Search
CPC .......... F16M 2200/024; F16M 2200/06; F16B 5/0225
See application file for complete search history.

(56) References Cited

U.S. PATENT DOCUMENTS 1,057,928 A * 4/1913 Briggs .................. F16B 5/0225
285/18
5,143,468 A * 9/1992 Pausch .................... F16C 11/10
16/322

(Continued)

FOREIGN PATENT DOCUMENTS

DE    202007003822 U1    6/2007
DE    102008057845 A1    5/2010

(Continued)

OTHER PUBLICATIONS

AN 310, 315, 316 & 320 Nut Chart.
Loctite 444 Technical Data Sheet.
Sigma Fasteners 2010 Bolting Catalog.

*Primary Examiner* — Bradley Duckworth

(57) ABSTRACT

An articulated mechanism and associated systems and methods therefore are disclosed. An example articulating mechanism within the scope of the disclosure includes a stud, a keyed washer having a plurality of threaded apertures, and a nut. The nut threadingly engages the stud. The nut includes a plurality of apertures segregated into a plurality of groups. A size of the apertures formed in the nut are larger than a size of the apertures formed in the keyed washer, resulting in an angular variation over which an aperture of the nut remains aligned with an aperture of the keyed washer. The apertures of the respective nut and washer are arranged such that at least one aperture of the nut aligns with an aperture of the keyed washer continuously throughout rotation of the nut relative to the keyed washer. The aligned apertures receive a fastener to secure the nut to the keyed washer.

21 Claims, 34 Drawing Sheets

(56) References Cited

U.S. PATENT DOCUMENTS

| | | | | |
|---|---|---|---|---|
| 5,533,794 | A | * | 7/1996 | Faison .................... B60B 27/00 301/105.1 |
| 5,743,503 | A | * | 4/1998 | Voeller ................... F16M 11/08 248/284.1 |
| 5,967,721 | A | * | 10/1999 | Giachinta ............. F16B 39/282 411/120 |
| 6,015,221 | A | * | 1/2000 | Bodell .................... F21V 21/26 362/370 |
| 6,086,207 | A | * | 7/2000 | Chapman ............. B66F 11/048 248/178.1 |
| 7,461,433 | B2 | | 12/2008 | Pan et al. |
| 7,770,860 | B1 | * | 8/2010 | Culpepper ........... A61G 12/002 248/324 |
| 8,783,975 | B1 | | 7/2014 | Cifers |
| 9,280,037 | B2 | * | 3/2016 | Leblanc .................. G03B 15/03 |
| 9,333,142 | B2 | * | 5/2016 | Schuerch, Jr. ..... A61G 13/1235 |
| 9,839,306 | B2 | * | 12/2017 | Atkins .................... A47F 10/06 |
| 2008/0037207 | A1 | * | 2/2008 | Chih ...................... F16M 11/10 361/679.01 |
| 2009/0212184 | A1 | * | 8/2009 | Bourgeois ............. F16M 11/10 248/288.11 |
| 2010/0038498 | A1 | * | 2/2010 | Enos ...................... F16M 11/16 248/163.2 |
| 2016/0258460 | A1 | * | 9/2016 | Gorodinsky .......... F16B 5/0225 |

FOREIGN PATENT DOCUMENTS

| | | | |
|---|---|---|---|
| EP | 3019371 | A2 | 5/2016 |
| WO | 2015006388 | A2 | 1/2015 |

* cited by examiner

LOCKING NUT AND WASHER

TECHNICAL FIELD

The present disclosure relates to systems, devices, and methods for a locking mechanism that permits pivoting between connected features via a joint while preventing loosening and detachment at the joint. More particularly, the present disclosure relates to a nut and washer that connect to one another, allowing pivoting between pivotably connected features while preventing decoupling of the features as a result of relative movement therebetween.

SUMMARY

According to one aspect, the disclosure describes an articulating mechanism that includes a stud, a keyed washer, and a nut. The stud includes a shaft having a threaded portion. The keyed washer includes a plurality of threaded apertures. Each of the plurality of apertures of the keyed washer has a first size. The nut includes an inner threaded surface adapted to threadingly engage the threaded portion of the shaft of the stud. The nut also includes a plurality of apertures segregated into a plurality of groups. Each of the plurality of apertures has a second size larger than the first size. The apertures of the plurality of apertures within each group are separated by a first angular offset, and adjacent groups are separated by a second angular offset that is defined by an angular offset between adjacent apertures in adjacent groups. The first angular offset is different than the second angular offset. An angular variation is defined by a ratio of the first size to the second size. Rotation of the nut relative to the keyed washer by an angular amount that is one half of the angular variation causes at least one of the plurality of apertures of the nut to align with a corresponding threaded aperture of the plurality of threaded apertures of the washer.

Another aspect of the disclosure encompasses an articulated mounting arm having a first arm and a second arm pivotably connected to the first arm at a joint. The second arm includes a housing flange. A pivoting mechanism is formed in the joint and includes a stud connected to the first arm. The stud includes a shaft that includes a threaded portion, and the housing flange is received onto the shaft. The pivoting mechanism also includes a keyed washer. The keyed washer includes a plurality of threaded apertures. Each of the plurality of apertures of the keyed washer has a first size. The keyed washer is received onto the shaft of the stud adjacent to the housing flange. The pivoting mechanism also includes a nut. The nut includes an inner threaded surface adapted to threadingly engage the threaded portion of the shaft of the stud and a plurality of apertures segregated into a plurality of groups. Each of plurality of apertures has a second size larger than the first size. Apertures of the plurality of apertures within each group are separated by a first angular offset, and adjacent groups are separated by a second angular offset that is defined by an angular offset between adjacent apertures in adjacent groups. The first angular offset is different than the second angular offset. An angular variation is defined by a ratio of the first size to the second size, and rotation of the nut relative to the keyed washer by an angular amount that is one half of the angular variation causes at least one of the plurality of apertures of the nut to align with a corresponding threaded aperture of the plurality of threaded apertures of the washer. The pivoting mechanism also includes a fastener threadably receivable into any of the plurality of threaded apertures of the keyed washer that is aligned with an aperture of the plurality of apertures of the nut.

The various aspects may include one or more of the following features. The stud may also include a first flat surface formed on the stud, and the keyed washer may include a second flat surface that cooperates with the first flat surface to prevent the keyed washer from rotating on the shaft of the stud. The nut further may include a plurality of raised points. The plurality of raised points may conform to a hexagonal relationship. The angular variation may be three degrees; the first angular offset may be 21 degrees; and the second angular offset may be 36 degrees. The angular variation may be three degrees; the first angular offset may be 21 degrees; and the second angular offset may be 36 degrees. The angular variation may be three degrees; the first angular offset may be 27 degrees; and the second angular offset may be 33 degrees. The first size may be 0.172 inches, and the second size may correspond to an M3×0.5 bolt.

The various aspects may also include one or more of the following features. The stud may also include a first flat surface formed on the stud, and the keyed washer may include a second flat surface that cooperates with the first flat surface to prevent the keyed washer from rotating on the shaft of the stud. A journal bearing may be disposed in an annular space formed between an outer surface of the shaft of the stud and an inner surface of the housing flange. The journal bearing may be formed from a polymer. A first thin washer and a first thrust washer, abutting the first thin washer, may be disposed on a shaft of the stud between a keyed washer and a housing flange. The stud may also include a flange mounted to the first arm. A second thin washer and a second thrust washer, abutting the second thin washer, may be disposed on the shaft of the stud between a flange of the stud and a housing flange. The nut may also include a plurality of raised points. The plurality of raised points may conform to a hexagonal relationship. The angular variation may be three degrees; the first angular offset may be 21 degrees; and the second angular offset may be 36 degrees. The angular variation may be three degrees; the first angular offset may be 27 degrees; and the second angular offset may be 33 degrees. The first size may be 0.172 inches, and the second size may correspond to an M3×0.5 bolt.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

DETAILED DESCRIPTION

Figure 1:
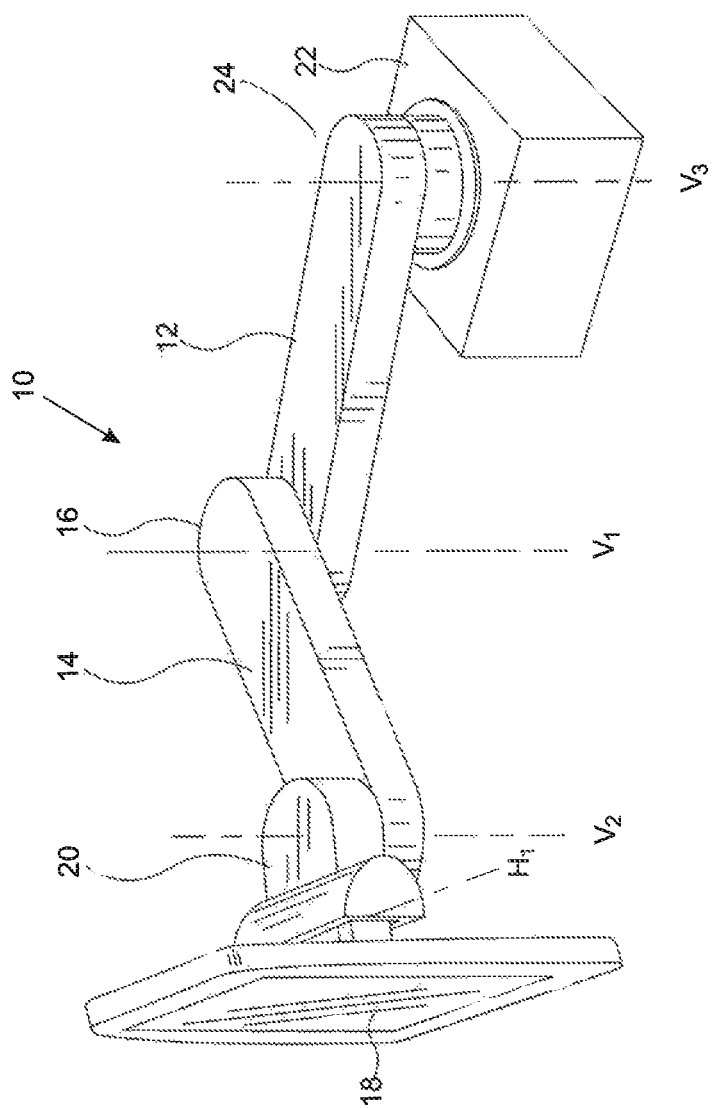
FIG. 1 shows an example articulated display mounting arm.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present description is made in the context of an articulated mounting arm onto which a display is mounted. Such articulated display mounting arms may be included on a surgical console for use in performing surgical procedures. However, the scope of the disclosure is not so limited. Rather, the coupling mechanism described herein may be utilized on any articulating device having components pivotably coupled to each other. The scope of the present disclosure is intended to encompass any application of the described technology. Thus, the description of the coupling mechanism in the context of the example articulated display mounting arms, described below, is merely provided as an example and is not intended to be limiting.

FIG. 1 shows an example articulated display mounting arm, referred to as mounting arm 10. The mounting arm 10 includes a first arm 12, a second arm 14 pivotably connected to the first arm 12 at a first joint 16, and a display 18 pivotably connected to the second arm 14 via a second joint 20. The mounting arm 10 is also connected to a medical system 22, such as a surgical console, at a third joint 24 via the first arm 12. Each of the joints 16, 20, and 24 define a vertical axis V1, V2, and V3, respectively.

The display 18 may be any display device, such as a flat panel display, a cathode ray tube (CRT) display, or any other type of display. In some implementations, the display 18 may be a touch screen display such that a user may make an input to the surgical console by touching screen of the display. In some implementations, the display 18 may include a graphical user interface (GUI). In addition to being pivotable about a vertical axis V2, the display 18 is also shown being pivotable about a horizontal axis H1.

Figure 2:
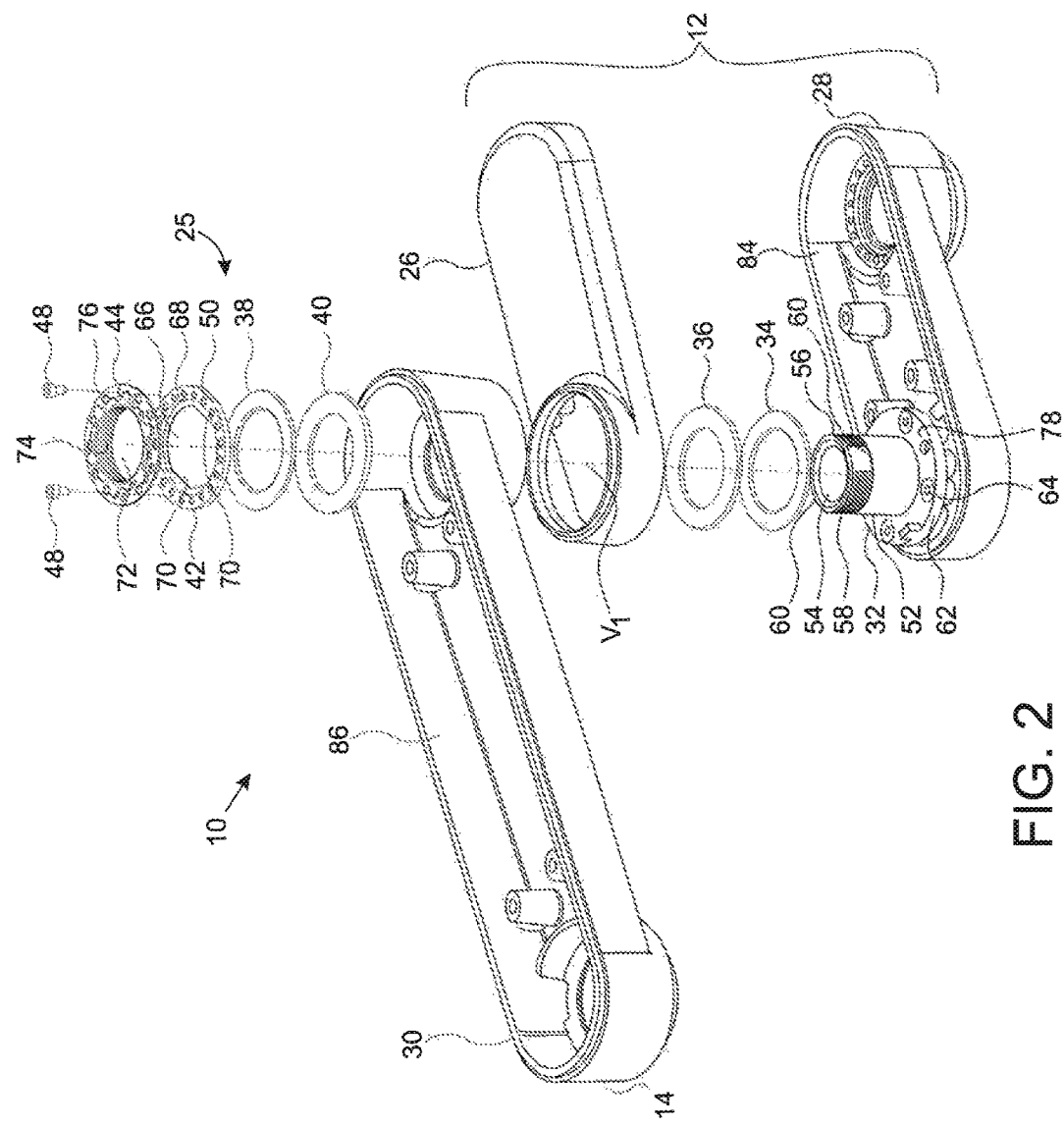
FIG. 2 is an exploded view of a portion of the example articulated display mounting arm of FIG. 1.
Figure 3:
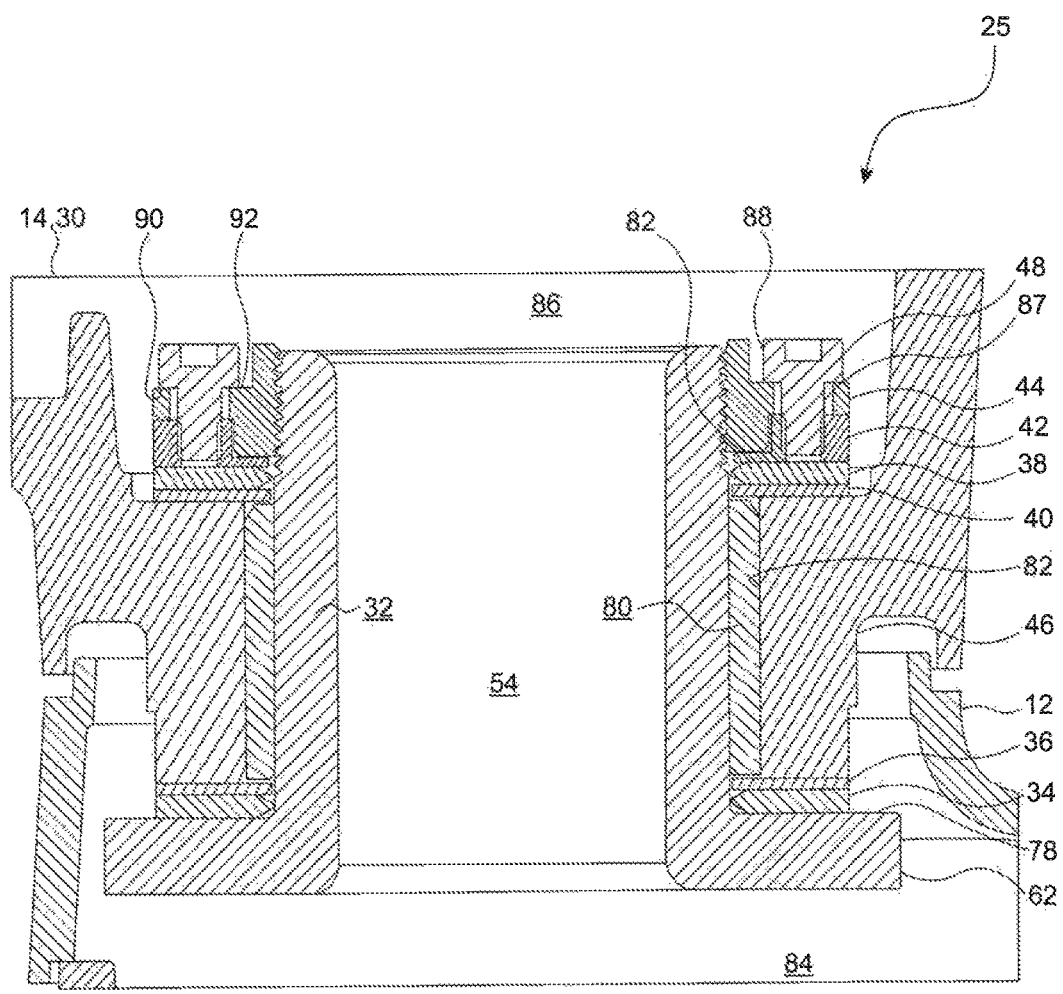
FIG. 3 is a cross-sectional view of a joint of the articulated display mounting arm of FIG. 1 showing an example pivoting mechanism formed within the joint.

FIG. 2 is an exploded view of a portion of the mounting arm 10 shown in FIG. 1, illustrating components forming a pivoting mechanism 25 at the first joint 16. While only the first joint 16 is illustrated, each of joints 16, 20, and 24 may have the illustrated construction. Further, one, two, or all of the joints 16, 20, and 24 may have such a construction, whereas one or more of the joints 16, 20, and 24 may have a different construction. FIG. 3 shows a cross-sectional view of the first joint 16. Again, any or all of the joints 16, 20, and 24 may have a construction that is the same as or similar to the construction shown in FIGS. 2 and 3.

In the example shown in FIG. 2, the first arm 12 includes a first portion 26 and a second portion 28. FIG. 2 shows a portion 30 of the second arm 14. The pivoting mechanism 25 pivotably connecting the first arm 12 and the second arm 14 includes a stud 32, a first flat washer 34, a first thrust washer 36, a second flat washer 38, a second thrust washer 40, a keyed washer 42, and a nut 44. The portion 30 of the second arm 14 includes a housing flange 46 (shown in FIG. 3) that also forms part of the pivoting mechanism 25. In some instances, the housing flange 46 may form an integral part of the second arm 14. In other instances, the housing flange 46 may be a separate component coupled to the second arm 14. The pivoting mechanism 25 also includes fasteners 48. In some implementations, the fasteners 48 may be threaded screws. In other implementations, the fasteners may be any other type of fastener operable to join the keyed washer 42 and the nut 44. Although two fasteners are shown, as discussed below, additional or fewer fasteners may be used. For example, in some implementations, a single fastener may be used to join the keyed washer 42 and the nut 44.

As shown in FIG. 2, the keyed washer 42 includes a plurality of apertures 50. Particularly, in the illustrated example, the keyed washer 42 includes 20 apertures 50. However, as discussed below, other implementations may have fewer or more apertures 50. The apertures 50 may include an internally threaded surface that cooperates with a threaded surface of the fasteners 48 to fixedly couple the keyed washer 42 and the nut 44.

While the example shown in FIGS. 2 and 3 shows the pivoting mechanism 25 as including the thrust washers 36 and 40 and the flat washers 34 and 38, the scope of the disclosure is not so limited. In other implementations, the flat washers and the thrust washers may be eliminated.

The stud 32 includes a shaft 52 defining a passage 54 that extends through the stud 32. The shaft 52 also includes a threaded surface 56 formed on an end portion 58 of the shaft 52. A pair of flat surfaces 60 is also formed on the end portion 58 of the shaft 52. The stud 32 also includes a flange 62. A plurality of apertures 64 are formed in the flange 62. The apertures 64 accept one or more fasteners to couple to the stud 32 to the second portion 28 of the first arm 12. In other implementations, the stud 32 may be coupled to the first arm 12 in other ways. For example, an interlocking fit, an adhesive, welding, or other joining method may be used to joining the stud 32 to the first arm 12.

The keyed washer 42 includes an opening 66 defined by an inner surface 68. A pair of flat surfaces 70 is formed on the inner surface 68. The keyed washer 42 is received onto the shaft 52 of the stud 32, with the shaft 52 passing through the opening 66. The pair of flat surfaces 70 formed on the inner surface 68 of the keyed washer 42 cooperates with the pair of flat surfaces 60 formed on the end portion 58 of the stud 32. In some implementations, the flat surfaces 70 of the keyed washer 42 may have an interference fit with the flat surfaces 60 of the stud 32. In other implementations, a fit between the flat surfaces 70 and the flat surfaces 60 is not an interference fit. The two pairs of flat surfaces 70 and 60 prevent rotation of the keyed washer 42 relative to the stud 32. While the illustrated example shows the stud 32 and the keyed washer 42 as each having two flat surfaces formed thereon, the scope of the disclosure is not so limited. In other implementations, each of the stud 32 and the keyed washer 42 may have a single flat surface or more than two flat surfaces. In still other implementations, the stud 32 and keyed washer 42 may include any other cooperating shapes or features that prevent rotation of stud 32 and the keyed washer 42 relative to each other.

The nut 44 includes an opening 72 defined by an inner threaded surface 74. The inner threaded surface of the nut 44 threadably engages the threaded surface 56 formed on the stud 32. The nut 44 also includes a plurality of apertures 76. In the illustrated example, the nut 44 includes 12 apertures 76. However, the scope of the disclosure is not so limited. In other implementations, the nut 44 may include more or fewer apertures 76.

FIG. 3 shows a cross-sectional view of the assembled pivoting mechanism 25. As shown in FIG. 3, the stud 32 is attached to the first arm 12. Seated on surface 78 of the flange 62 of the stud 32 is the first flat washer 34. The first thrust washer 36 is disposed on the first flat washer 34. The housing flange 46 is disposed between the first and second thrust washers 36 and 40. A journal bearing 80 is also axially disposed between the first and second thrust washers 36 and 40 and radially disposed between the shaft 52 of the stud 32 and an inner surface 82 of the housing flange 46. In some implementations, the journal bearing may be formed of a polymeric material, such as, for example, Delrin® manufactured by the E. I. du Pont de Nemours and Company of 1007 Market Street, Wilmington, Del. 19898. In other implementations, other polymeric materials may be used, including nylon, for example; lubricant-impregnated materials; metals, including bronze, for example; or other materials may be used to form the journal bearing 80. In some implementations, the journal bearing 80 may have an interference fit with the shaft 52 of the stud 32. In other implementations, the journal bearing 80 and the shaft 52 of the stud 32 may not have an interference fit. The second flat washer 38 is disposed between the second thrust washer 40 and the keyed washer 42. As explained above, the flat surfaces 70 formed on the inner surface 68 of the keyed washer 44 are aligned with flat surfaces 60 formed on the shaft 52 of the stud 32 so that the keyed washer 44 is prevented from rotating relative to the stud 32.

The nut 44 is threaded onto the end portion 58 of the stud 32 via the mating thread surfaces 74 and 56 formed respectively thereon. As shown in FIG. 3, a collar 80 formed in the nut 44 is received into an annular recess 82 formed in the keyed washer 42. The nut 44 captures all of the other components (i.e., the first and second flat washers 34 and 38, the first and second thrust washers 36 and 40, the housing flange 46, the journal bearing 80 and the keyed washer 42) between the flange 62 of the stud 32 and itself. The nut 44 may have a desired torque applied thereto. The desired torque may apply a desired preload to the pivoting mechanism 25 to ensure a desired level of friction exists during articulation of the pivoting mechanism 25. The desired level of friction may ensure a desired amount of resistance to movement is present. In the illustrated example, a selected level of resistance between the components of the mounting arm 10 (e.g., the first and second arms 12 and 14) may be desired so that, once articulation of the pivoting mechanism 25 ceases, the first and second arms 12 and 14 are not easily moved relative to one another. Such a resistance to movement between the components attached via the pivoting mechanism provides easy manipulation of the pivoting mechanism while also ensuring that, once moved, the components pivotably connected via the pivoting mechanism will maintain their relative positions until a user desires a change in their relative positions.

The flat washers, i.e., first and second flat washers 34 and 38, provide a flat surface against which the thrust washers, i.e., first and second thrust washers 36 and 40, contact. The flat surfaces provided by the first and second flat washers 34 and 38 and low friction surfaces provided by the first and second thrust washers 36 and 40 promote relative movement at the interface between the flat washers and the thrust washers as the pivoting mechanism 25 articulates. Generally, relative motion occurs during articulation of the pivoting mechanism 25 between the contacting flat washer and thrust washer. However, relative movement may occur at different or additional locations and between other or different components of the pivoting mechanism 25. For example, relative movement may occur between the first flat washer 34 and the surface 78 of the flange 62 exclusively or in addition to any relative movement between the thrust washers and the flat washers. In other instances, relative movement may occur between one or both of the thrust washers 36 and 40 and the housing flange 46 and/or between the second flat washer 38 and the keyed washer 44.

Each of the first arm 12 and the second arm 14 define a cavity 84 and a cavity 86 formed respectively therein. The passage 54 of the stud 32 and the cavities 84 and 86 define a passage through which cables, wires, or other components, such as those connecting the display 18 to the medical system 22, may be routed.

The fastener 48 includes a shank 87 and a head 88. A size of the head 88 is larger than a size of the shank 87. An end of the shank 87 is threaded so as to threadingly mate with a threaded aperture 50 formed in the keyed washer 42. A surface 90 formed on the head 88 contact a surface 92 formed on the keyed washer 42 when the fastener 48 has been sufficiently threaded into an aperture 50.

Figure 4:
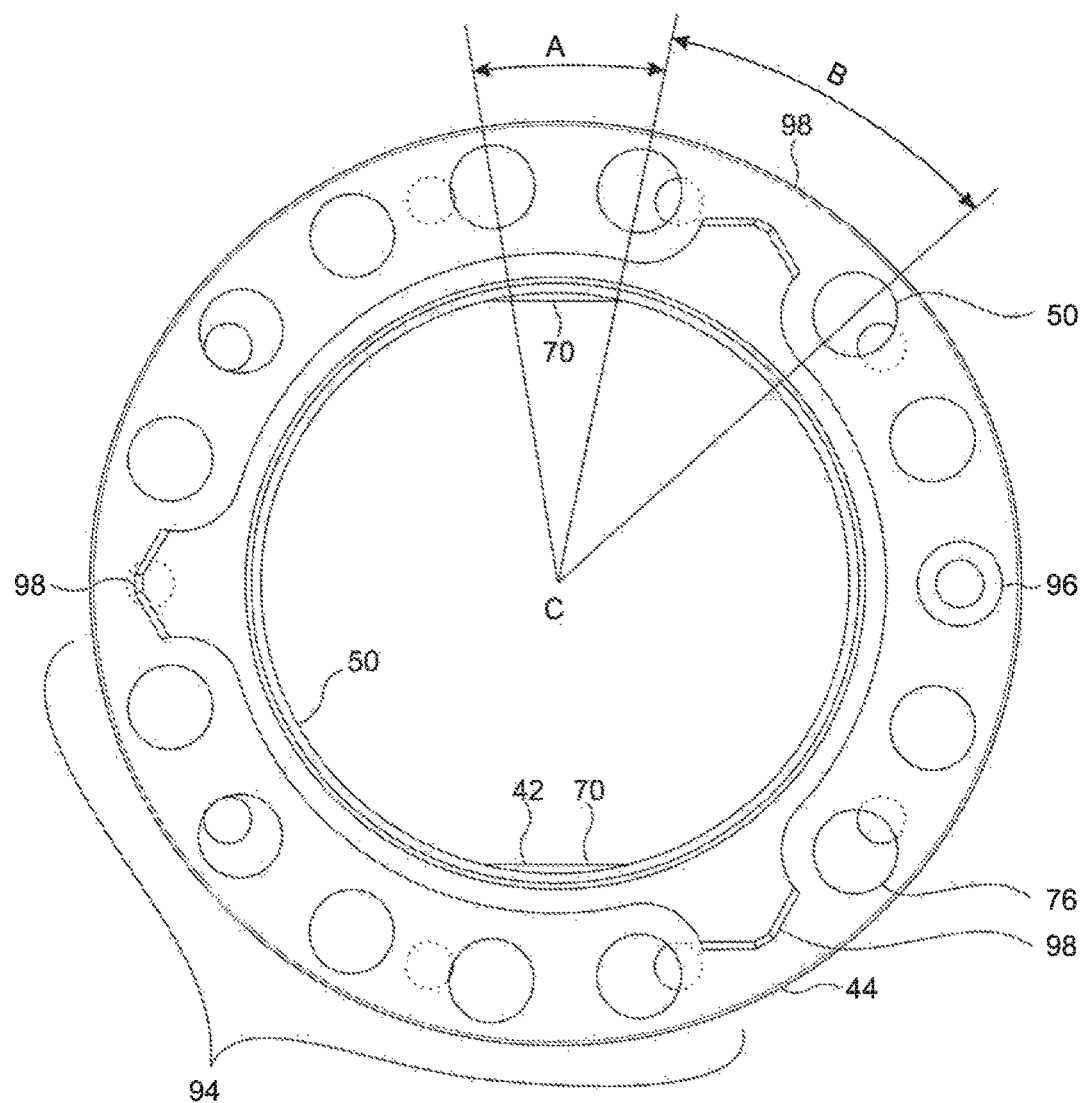
FIGS. 4-6 are top views of an example nut and keyed washer combination shown at different angular positions relative to each other.

In the example shown in FIG. 3, a diameter of the head 88 is larger than a diameter of the shank 87. FIG. 3 shows the shank 88 of the fasteners 48 extending through apertures 76 formed in the nut 44 and threading into the threaded apertures 50 formed in the keyed washer 42. While FIG. 3 shows fasteners 48 matingly engaged with corresponding apertures 50 intersected by the a cross-sectional plane represented therein, i.e., the centerlines of the apertures 50 engaged by the fasteners 48 being disposed at 180° to each other, the scope of the disclosure is not so limited. FIG. 4 shows a single alignment 96 of an aperture 50 in the keyed washer 42 and a centerline of an aperture 76 in the nut 44. In this example, the centerline of the aperture 50 is also aligned with a centerline of the aperture 76. A single fastener received into the aligned aperture 50 and aperture 76 is sufficient to interlock the keyed washer 42 with the nut 44 and prevent unintended loosening of the nut 44 on stud 32.

Figure 5:
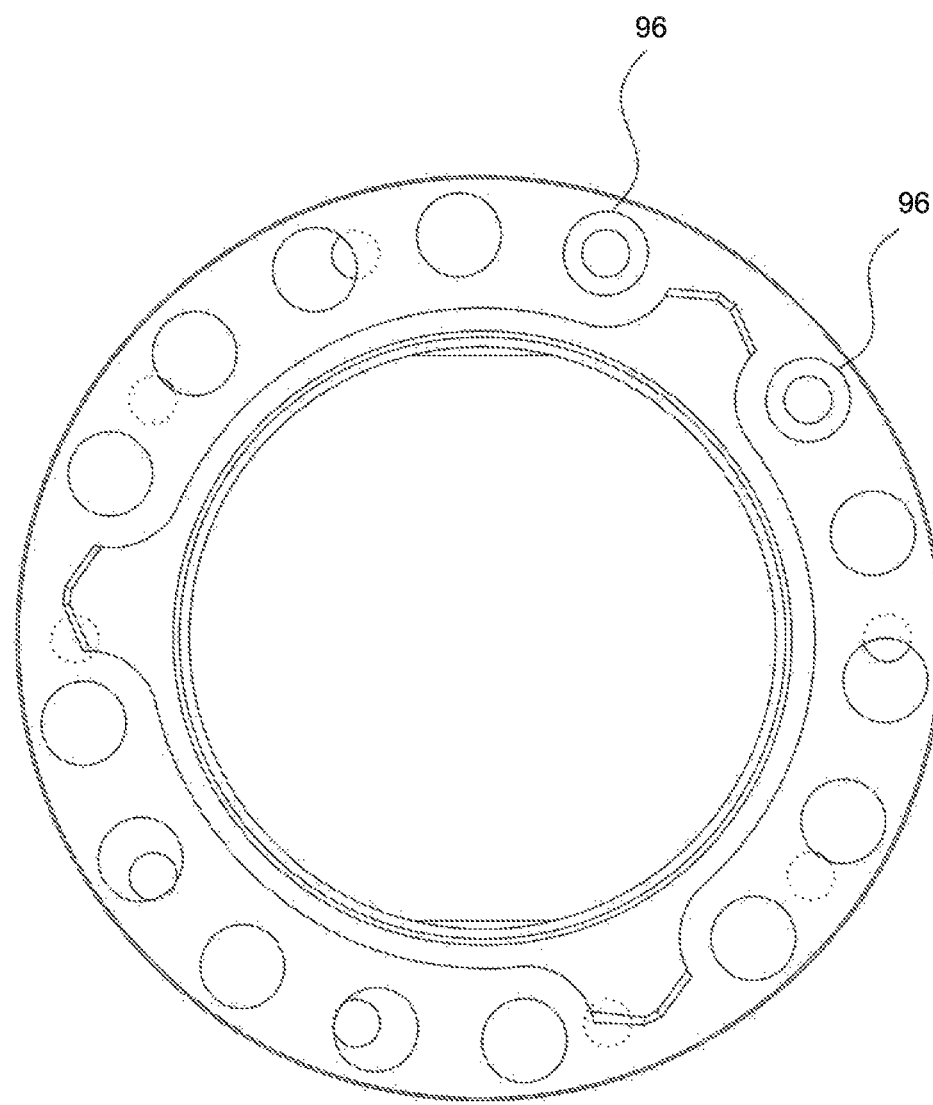
Figure 6:
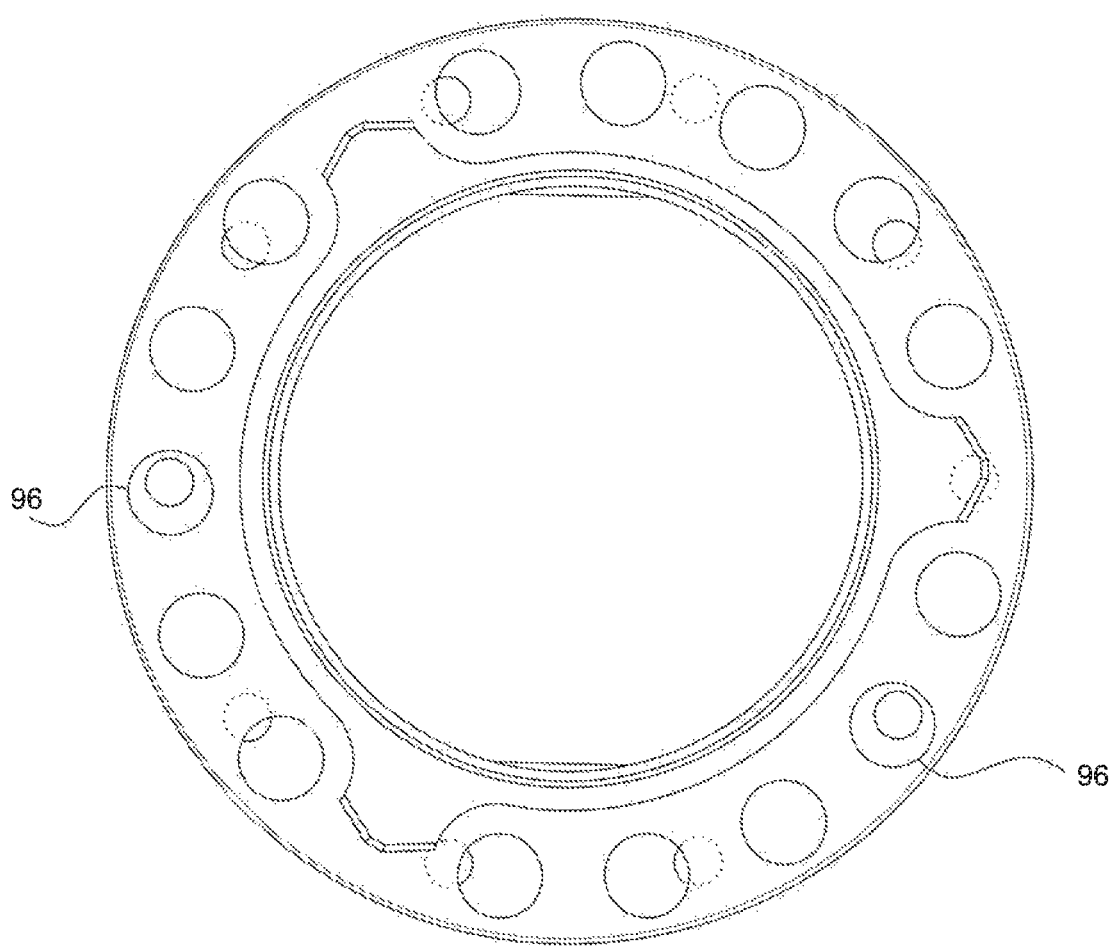
Figure 7:
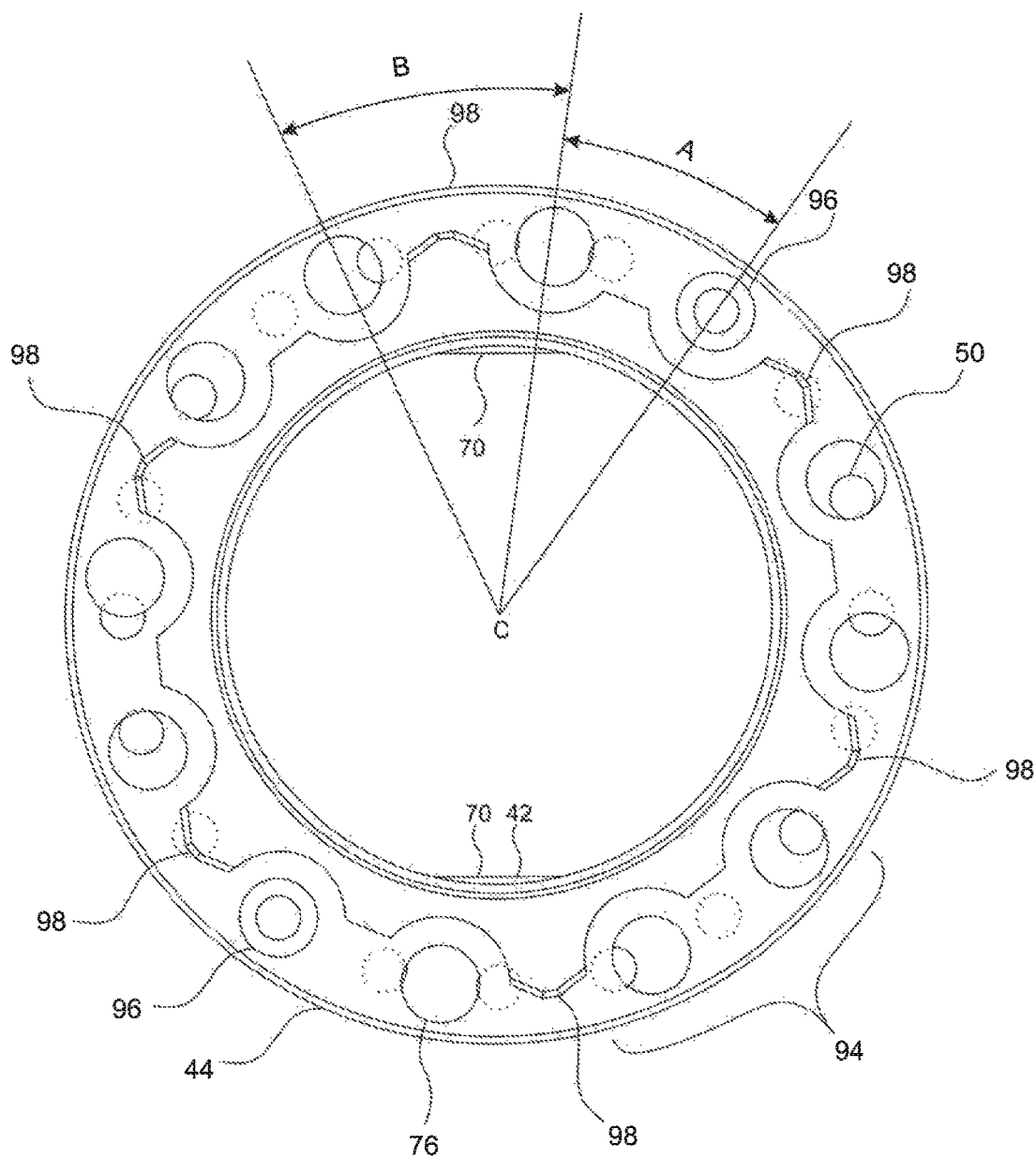
FIGS. 7-9 are top view of another example nut and keyed washer combination shown at different angular positions relative to each other.
Figure 8:
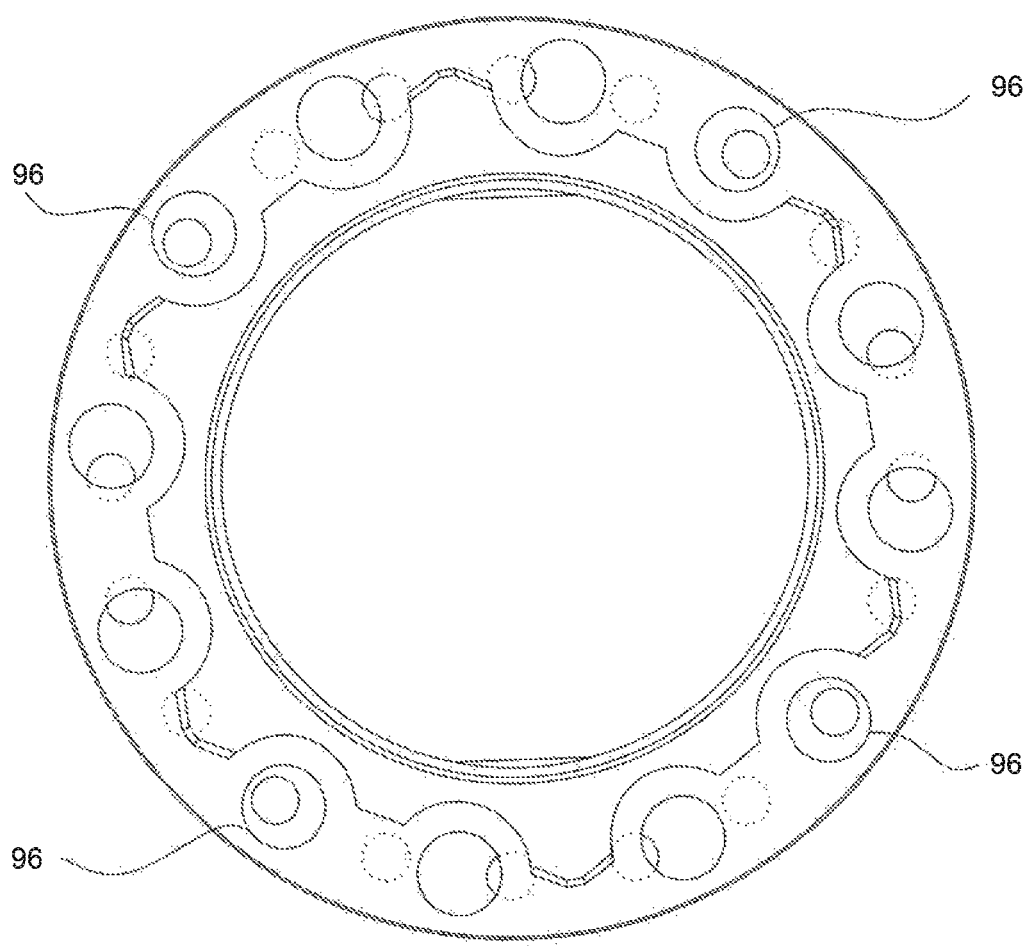
Figure 9:
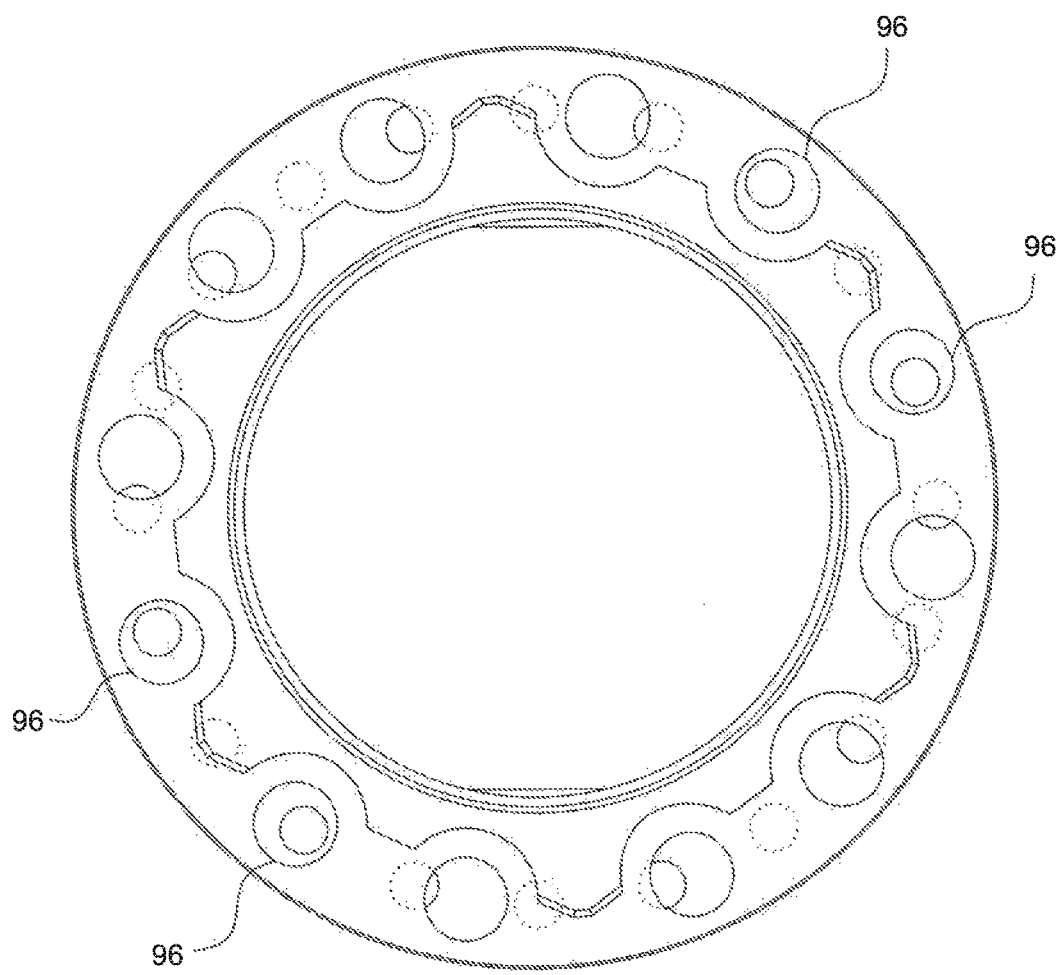

In other instances, more than one aperture 50 in the keyed washer 42 and an aperture 76 in the nut 44 may align where the corresponding pair of apertures are not disposed along the same cross-sectional plane. For example, each of FIGS. 5 and 7 show instances having two alignments 96 in which the centerlines of two apertures 50 are aligned with respective centerlines of corresponding adjacent apertures 76. However, the scope of the disclosure is even broader. For example, FIGS. 6, 8, and 9 show a plurality of alignments 96 of apertures 76 of the nut 44 with a corresponding plurality of apertures 50 of the keyed washer 42, although the centerlines of the corresponding apertures are not aligned. This alignment, notwithstanding the lack of alignment of the centerlines of the corresponding apertures, is sufficient to fixedly attach the keyed washer 42 and the nut 44 together and is the result of differences in the size of the apertures 76 compared to the size of the apertures 50. In some implementations, a 1.5 degree angular offset between the centerline of an aperture 76 with the centerline of an aperture 50 still permits the receipt of a fastener 48. Thus, in some implementations, an aperture 76 may be aligned sufficiently with an aperture 50 over a three degree angular range and still permit receipt of a fastener 48 to secure the nut 44 to the keyed washer 42.

As a general concept, alignment between one or more apertures formed in a keyed washer, such as keyed washer 42, and one or more apertures formed in a nut, such as nut 44, may be considered to be a function of an amount of angular variation (interchangeably referred to as "float") that can exist between an aperture in the nut and an aperture in the keyed washer that still permits insertion of a fastener into both of the apertures and, particularly, into the threaded aperture formed in the keyed washer. In the examples shown herein, this amount of angular variation is three degrees. That is, from a location where the centerlines of an aperture formed in the nut and an aperture formed in keyed washer are aligned, the angular alignment of the holes may vary by one and a half degrees of rotation in either direction of rotation of the nut and keyed washer relative to each other and still be aligned such that a fastener may be received into both apertures. Three degrees of float, however, is merely provided as an example. As such, other amounts of angular variation are within the scope of the disclosure and may be used.

An amount of float permitted between the nut 44 and the keyed washer 42 is established by sizes of the apertures formed respectively therein. In the illustrated examples, a size of the apertures 76 formed in the nut 44 is larger than a size of the apertures 50 formed in the keyed washer 42. For example, in some implementation, a size of the apertures 50 formed in the keyed washer may correspond to a metric M3×0.5 bolt, and a size of the apertures 76 formed in the nut 44 may be 0.172 inches in diameter. The relative sizes of apertures 50 and 76 permit three degree angular variation, permitting misalignment of the centerlines of the apertures 50 and 76 by one and half degree in either rotational direction (beyond a position where the respective centerlines of the apertures are aligned) and still permit receipt of the fastener 48 in both apertures 50 and 76. Again, other angular variations are contemplated by this disclosure. Three degrees of angular variation is merely provided as an example.

An important feature provided by the disclosure and the examples described herein is that, as a result of the combination of the angular variation, the number of a apertures 76 formed in the nut 44, the number of the apertures 50 formed in the keyed washer 42, the angular spacing B between groups of apertures 76, and the angular spacing A between apertures 76 within a group 94 results in an alignment 96 always being present throughout an entire 360° range of rotation of the nut 44 relative to the keyed washer 42. This characteristic provides yet another benefit. For example, during assembly of the pivoting mechanism 25, once the nut 44 has been torqued to a desired value, there is always assured of at least one alignment 96 between an aperture 76 and aperture 50. This benefit precludes the need to further rotate the nut 44 relative to the keyed washer 42, thereby tightening the nut 44 to a larger torque, in order to cause alignment between an aperture 76 and an aperture 50. Similarly, it precludes the need to loosen the nut 44 in order to cause alignment between an aperture 76 and an aperture 50. Thus, for pivoting mechanism within the scope of the disclosure, for any amount of angular rotation of the nut 44 relative to the keyed washer 42, whether a rotation larger or smaller than the angular variation, one half of the angular variation, or some other fraction of the angular variation, at least one aperture 76 formed in the nut 44 will be aligned with a corresponding aperture 50 formed in the keyed washer 42.

An aspect involved in the selection of a number of apertures 76 and apertures 50 is described below. With an amount of angular variation defined (three degrees of angular variation being selected for these examples), a number of matched pairs of apertures 76 and 50 is determined by dividing 360° by the angular variation. In the case of three degrees of angular variation, the total number of unique pairs of apertures 50 and 76 is 120. In the illustrated example, though, and for reasons explained below, it is desired that there always be two alignments 96, i.e., two apertures 76 aligned with a corresponding aperture 50. As such, the 120 result is multiplied by two, resulting in 240.

Figure 24:
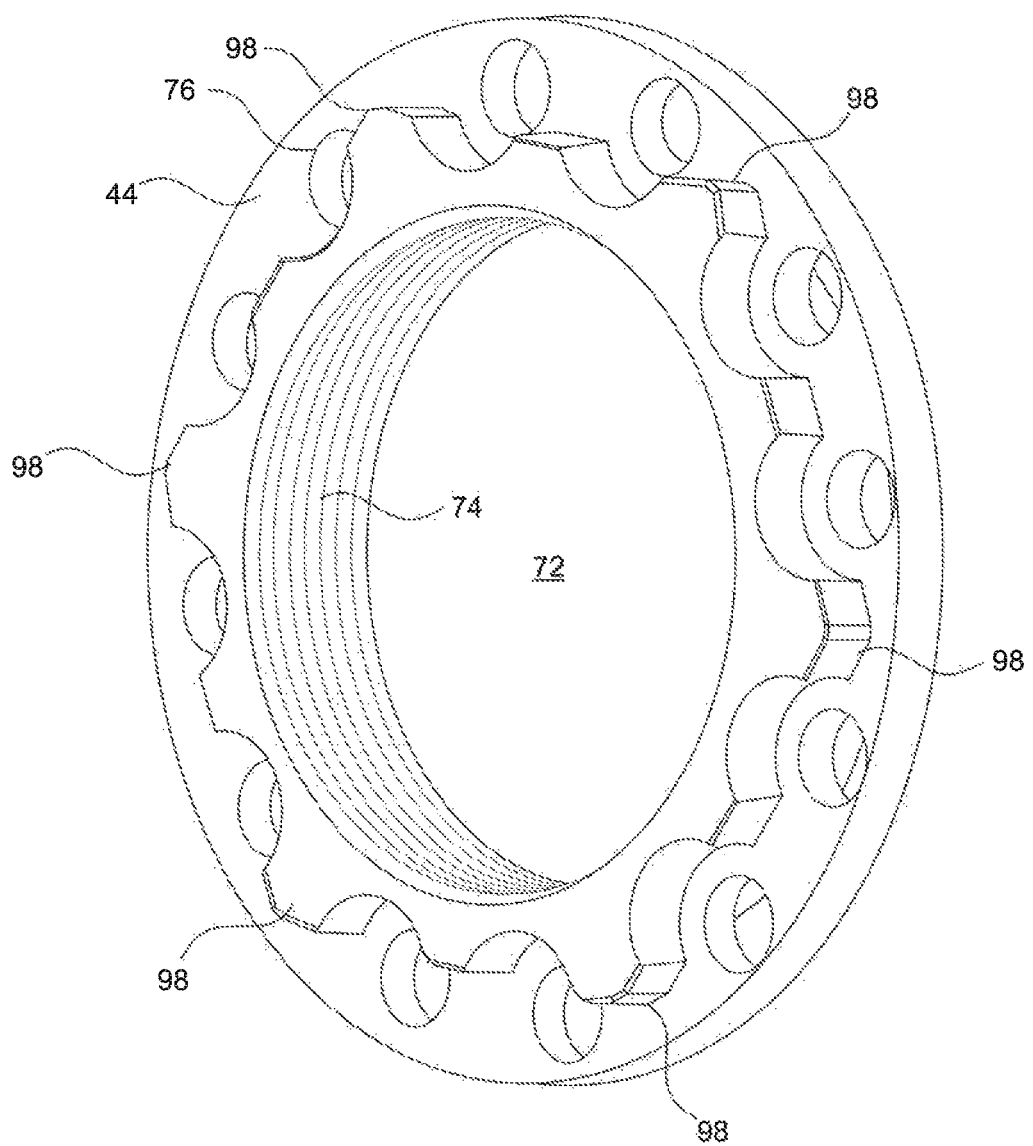
FIGS. 24 and 25 show the nut and keyed washer, respectively, of the example shown in FIGS. 7-9.
Figure 25:
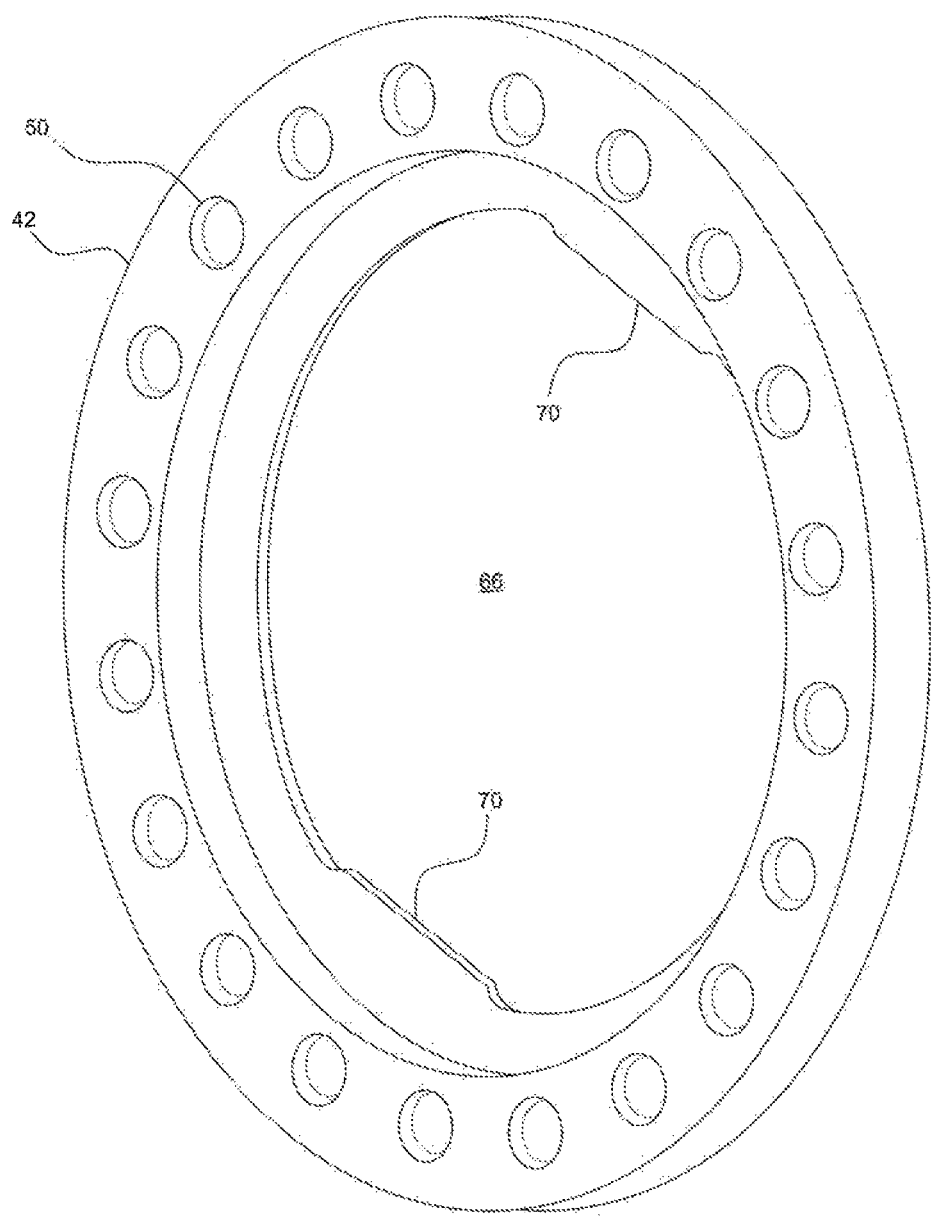

FIGS. 7, 8, and 9 illustrate another example nut 44 and keyed washer 42 combination having an angular variation of three degrees. An angular variation of three degrees results in the presence of twelve apertures 76 formed in the nut 44 and twenty apertures 50 formed in the keyed washer 42, since twelve times twenty is 240. The apertures 50 formed in the keyed washer 42 are evenly distributed along a circumference of the keyed washer. Particularly, in this example, each aperture 50 is angularly separated from a neighboring aperture 50 by 18°. The apertures 76, though, are not evenly distributed along the nut 44. Rather, the apertures 76 are arranged in groups. The apertures 76 within a group are equally distributed by a selected angular spacing. However, the angular spacing of the groups is different from the angular spacing of the apertures within a group. In the particular example shown in FIGS. 7, 8, and 9, the angular spacing A between apertures 76 within a group 94 is 27°. The angular spacing B between adjacent groups 94 (measured from adjacent apertures 76 from adjacent groups 94) is 33°. The nut 44 also includes six raised points 98 that may be used to tighten the nut 44. The nut 44 and keyed washer 42, shown in FIGS. 7, 8, and 9, are illustrated in FIGS. 24 and 25, respectively. FIGS. 24 and 25 show perspective views of the nut 44 and keyed washer 42. A design such as that shown in FIGS. 7, 8, and 9 provides more than one alignment 96 continuously present for any amount of rotation of the nut 44 relative to the keyed washer 42. Consequently, more than one alignment 96 is present for any number of successive rotations of one half of the angular variation.

Again, the keyed washer 42 and nut 44 shown in FIGS. 7, 8, and 9 are merely examples. These illustrated examples are just that and are not intended to be limiting.

Further, there are a large number of possible combinations of the number of apertures 76 and the number of apertures 50 that may satisfy a desired angular variation. The number of apertures 76 and apertures 50 satisfying a desired angular variation may also be tempered by other factors. For example, the desired respective sizes of the apertures 76 and apertures 50, a size of the nut 44, a size of the keyed washer 42 are some additional factors.

A benefit of the present disclosure is that an alignment between at least one aperture formed in a nut and a corresponding aperture in the keyed washer results not only for each rotation in the amount of one half of the angular variation of the nut relative to the keyed washer but, more generally, for any amount of rotation of the nut 44 relative to the keyed washer 42. Thus, as explained above, an alignment 96 between an aperture 76 and an aperture 50 is assured to exist for an articulating device within the scope of this disclosure. For the examples shown in FIGS. 4-6, the number of alignments 96 varies between one and two as the nut 44 is rotated relative to the keyed washer 42 for any given amount of rotation of the nut 44 and keyed washer 42 relative to each other. This includes a rotation amount of one and a half degrees of rotation, which is one half of the three degrees of angular variation. FIGS. 7 through 9 illustrate rotations of the nut 44 relative to the keyed washer 42 for a given one half of an angular variation and the alignments 96 that occur as a result. However, the rotations reflected in FIGS. 7 through 9 are merely provided as examples. As already explained, at least one alignment 96 is present for any amount of rotation of the nut 44 relative to the keyed washer 42.

For the example shown in FIGS. 7 through 9, the number of alignments 96 at each rotation of one half of the angular variation alternates between two and four. Thus, a nut and keyed washer combination within the scope of the disclosure assures at least one alignment between an aperture of the nut and keyed washer once the nut is torqued to a desired value. This precludes the need to continue rotating the nut beyond a designated torque value in order to achieve an alignment between apertures of the nut and keyed washer. Further, once the nut and keyed washer are coupled with a fastener, such as fastener 48, the nut is prevented from loosening. This maintains a constant resistance to articulating movement in the context of a pivotable joint as described above in reference to example pivoting mechanism 25 shown in FIG. 3.

The number of apertures that may be included on either of the keyed washer or nut may be affected by a number of factors. For example, the type of fastener, a size (e.g., diameter) of the fastener, and/or a size (e.g., diameter) of the keyed washer and nut.

The method described above of selecting a number of apertures to be formed in the nut 44 and the keyed washer 42 is merely an example. The example nut 44 and keyed washer 42 shown in FIGS. 4, 5, and 6 vary from this method while also having an angular variation of three degrees and maintaining at least one alignment 96 not only for each one and a half degrees of rotation of the nut 44 relative to the keyed washer 42 but also for any amount of rotation of the nut 44 relative to the keyed washer 42. For example, as shown in FIGS. 4, 5, and 6, the nut 44 includes fifteen apertures 76, and the keyed washer 42 includes ten apertures 50, resulting in 150 unique pairs of apertures 50 and 76.

Another factor that may affect the number of apertures 50 and 76 is the number of groups 94 of apertures 76 formed on the nut 44. Where the number of groups is even, for a given aperture 76, there will be another aperture 76 whose centerline is 180° offset from the centerline of the given aperture 76. Consequently, for such implementations and in which the keyed washer 42 includes apertures 50 that are angularly offset by 180° from each other, there will always be at least two alignments 96 for a given any amount of rotation of the nut 44 relative to the keyed washer 42, including an incremental rotation of one half of the angular variation, as described herein. Thus, as explained above, the example nut 44 and keyed washer 42 shown in FIGS. 7, 8, and 9 always have at least two alignments 96 for any amount of rotation of the nut 44 relative to the washer 42. On the other hand, the example nut 44 shown in FIGS. 4, 5, and 6 includes three groups 94. As a result of the odd number of groups 94 and the associated angular spacing B between the groups 94 and angular spacing A of the apertures 76 within each group 94, for a given aperture 76, there does not exist another aperture 76 whose centerline is offset 180° from the given aperture 76. As result, the number of alignments 96 continuously varies between one and two alignment 96 as the nut 44 and keyed washer 42 are rotated relative to each other. FIGS. 7, 8, and 9 illustrate discrete rotations of one half of the angular alignment and show a single alignment 96 results at some rotations of between the nut 44 relative to the keyed washer 42 of one half of the angular variation for some rotations, and a plurality of alignments 96 for other rotations of one half of the angular variation. A single alignment 96 may be sufficient to interlock the nut 44 with the keyed washer 42. In some instances, a single alignment 96 may be all that is desired, while, in other instances, a plurality of alignments 96 may be desired.

Some practical considerations, though not necessarily technically limiting in nature, may also affect the number of apertures selected for each of the nut 44 and the keyed washer 42. The practical considerations are not intended to limit the scope of the disclosure. Rather, practical considerations are merely factors that one may use to select one possible design within the scope of the disclosure over another. For example, manufacturing costs may play a factor in the number of apertures formed in the keyed washer 42, as the apertures 50 may be threaded, which may require an additional manufacturing step beyond the formation of the aperture and, therefore, additional cost. Also, an excess number of apertures formed in either of the keyed washer 42 or the nut 44 may result in poor strength thereof. The number of apertures and their respective layout in the nut 44 may be selected so as to permit the nut 44 to be assembled with conventional tools. For example, the design of nut 44 shown FIGS. 4, 5, and 6, the nut 44 defines three raised points 98. In the illustrated example, the raised points 98 are arranged to permit the use of a standard six point socket to tighten the nut 44, although only three points of the socket would be engaged by the three raised points 98 formed on the nut 44. Although one or more raised points, such as raised points 98, may be incorporated or formed into the nut 44 to facilitate tightening of the nut 44 to a desired torque value, for example, the scope of the disclosure is not so limited. Other types of features may be included to assist in the assembly of the nut 44 onto the stud 32 and application of a desired torque to the nut 44. For example, the nut 44 may include a pair of apertures into which a spanner wrench may be inserted. The spanner wrench may then be used to tighten the nut 44.

As explained above, the example shown in FIGS. 4, 5, and 6 includes a keyed washer 42 that includes ten apertures 50 and a nut 44 that includes fifteen apertures 76. This example also includes a three degree angular variation or float. The ten apertures 50 are angularly distributed equally along a circumference of the keyed washer 42. The keyed washer 42, though, may include more than ten apertures 50. The apertures 76 formed in the nut 44 are not equally distributed. The apertures 76 are clustered in groups 94. In the illustrated example, the apertures 76 are clustered into three groups with five apertures 76 in each group 94. The groups 94 are uniformly distributed along a circumference of the nut 44. An angular spacing of the apertures 76 within a group 94 is constant. However, an angular spacing between the groups 94 is different than the angular spacing of the apertures 76 within a group 94. For example, in the example shown in FIGS. 4, 5 and 6, an angular spacing A between adjacent apertures 76 within a group 94 is 21°, and the angular spacing B between groups is 36°.

For the example shown in FIGS. 4, 5, and 6 and the example shown in FIGS. 7, 8, and 9, not only does every one and a half degree of rotation of the nut 44 relative to the keyed washer 42 result in at least one alignment 96 between at an aperture 50 formed in the keyed washer 42 and an aperture 76 formed in the nut 44, at least one alignment 96 between one of the apertures 76 and a corresponding aperture 50 is present continuously through the entire 360° range of rotation. More particularly, for the example illustrated in FIGS. 4, 5, and 6, the number of alignments 96 varies between one and two alignments 96 continuously over an entire 360° range of rotation. As shown in FIG. 4, a single alignment 96 between an aperture 76 and an aperture 50 exists. Further, in this instance, the centerlines of the apertures 76 and 50 are aligned. A one and a half degree of rotation (i.e., one half of the angular variation) in either direction beyond the position shown in FIG. 4 would still have the aperture 50 aligned with the aperture 76. In FIG. 5, two alignments 96 exist and, again, the centerlines of the corresponding apertures 76 and 50 are aligned. In FIG. 6, though, two alignments 96 between corresponding apertures 76 and 50 are present. However, in this instance, the centerlines of the corresponding apertures 76 and 50 are not aligned. Still, even in this instance, a fastener 48 would be receivable into both of the aligned apertures 76 and 50, permitting the nut 44 to be fixedly coupled to the keyed washer 42.

A nut and washer assembly according to the present disclosure provides a benefit and improvement in that, once a nut, such as nut 44, is tightened to a desired torque level, it is certain that at least one aperture 76 formed in the nut 44 will align with a corresponding aperture 50 formed in the keyed washer, so as to accept a fastener 48. That is, for a nut and washer combination as contemplated herein, further rotation of a nut beyond a desired torque setting is not required in order to align at least one aperture formed in the nut with a corresponding aperture formed in the keyed washer.

Another example is illustrated in FIGS. 10 through 22. Referring to FIGS. 10 through 22, a nut 44 includes six apertures 76 that are organized into three groups 94, each containing two apertures 76. An angular spacing A between apertures 76 within a group 94 is 33°. An angular spacing B between adjacent groups 94 is 87°. A keyed washer 42 includes twenty apertures 50 having a uniformed angular spacing between apertures 50 of 18°. This illustrated example also includes a three degree angular variation or float. The FIGS. 10-22 illustrate consecutive one and a half degrees of rotation of the nut 44 relative to the keyed washer 42. This amount of rotation coincidentally is one half of the angular variation applicable to this example. However, like the other combinations of nuts 44 and keyed washers 42, the example shown in FIGS. 10 through 22 ensures at least one alignment 96 between an aperture 76 and aperture 50 at any amount of rotation of the nut 44 relative to the keyed washer 42.

The number of apertures formed in the nut 44 and keyed washer 42 shown in FIGS. 10 through 22 conform to the method described above. That is, a three degree angular variation or float results in a value of 120, which is the product of twenty (for the twenty apertures 50 formed in the keyed washer 42) and six (for the six apertures 76 formed in the nut 44). It is also noted that, while the example presented in FIGS. 10 through 22 does produce two alignments 96 at some instances during rotation of the nut 44 relative to the washer 42 (as described below), these two alignments 96 do not involve simultaneous alignment of the centerlines of the respective apertures 76 and apertures 50.

Figure 10:
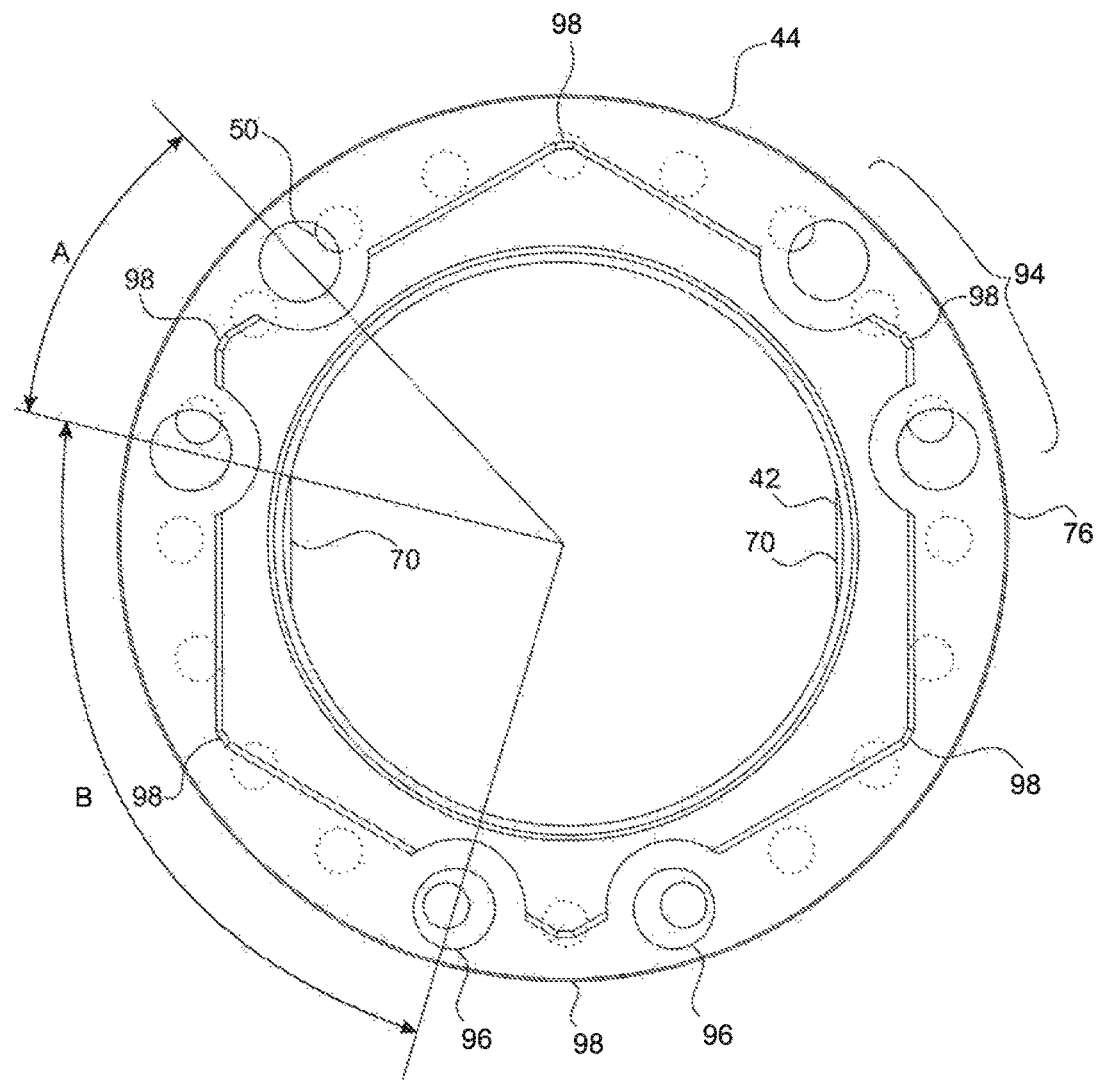
FIGS. 10 through 22 show a progressive movement of another example nut relative to another example keyed washer in increments of one half of an angular variation.
Figure 11:
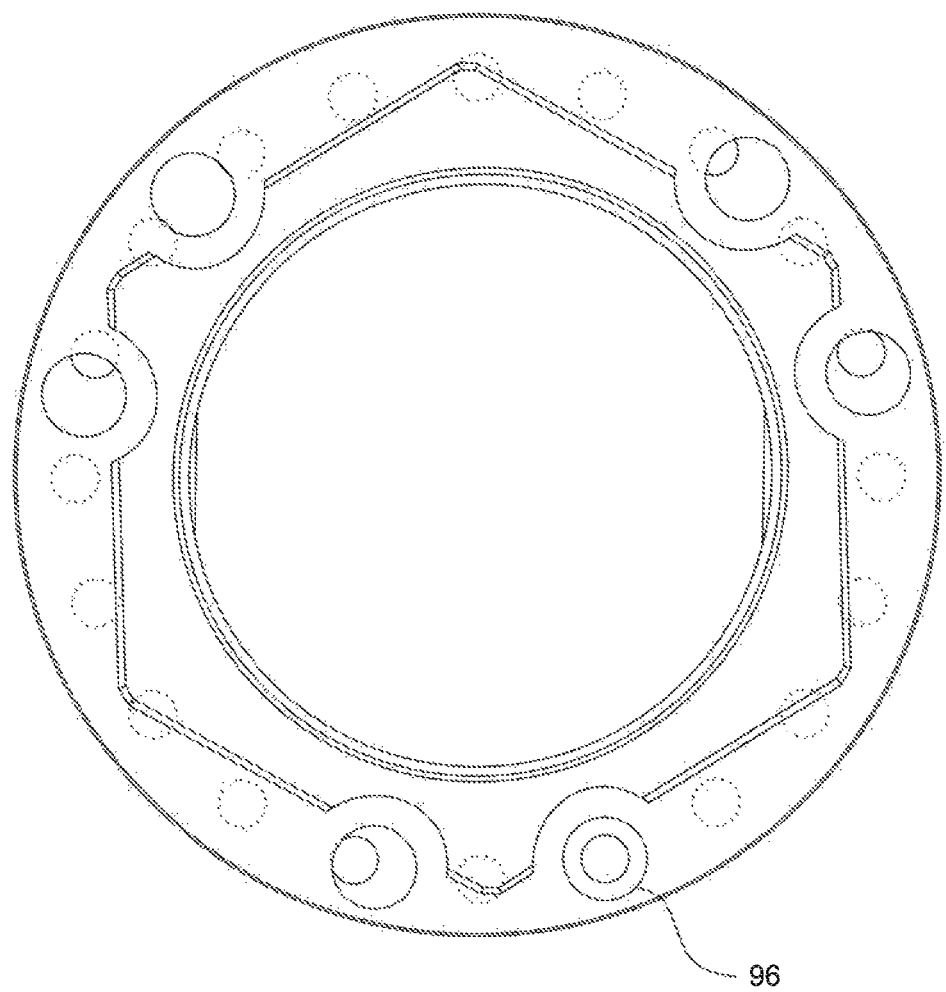
Figure 12:
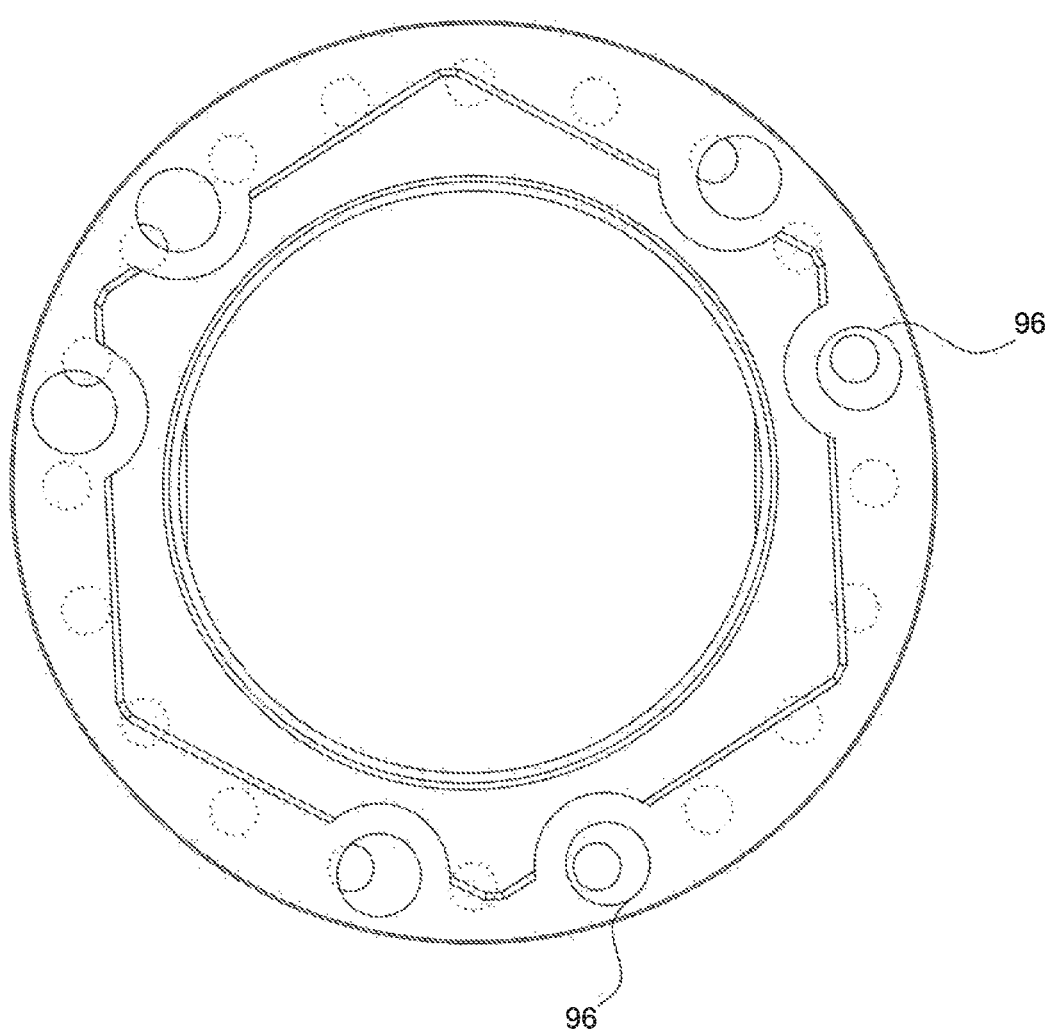
Figure 13:
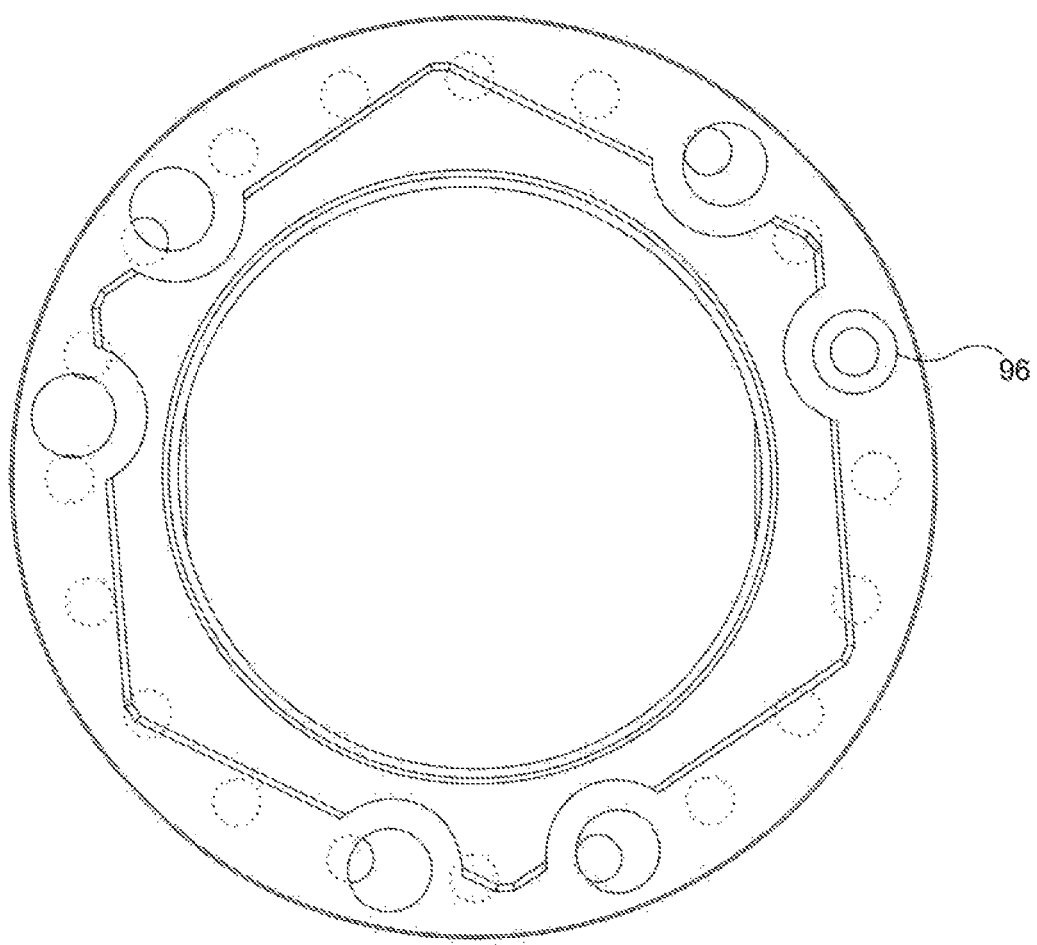
Figure 14:
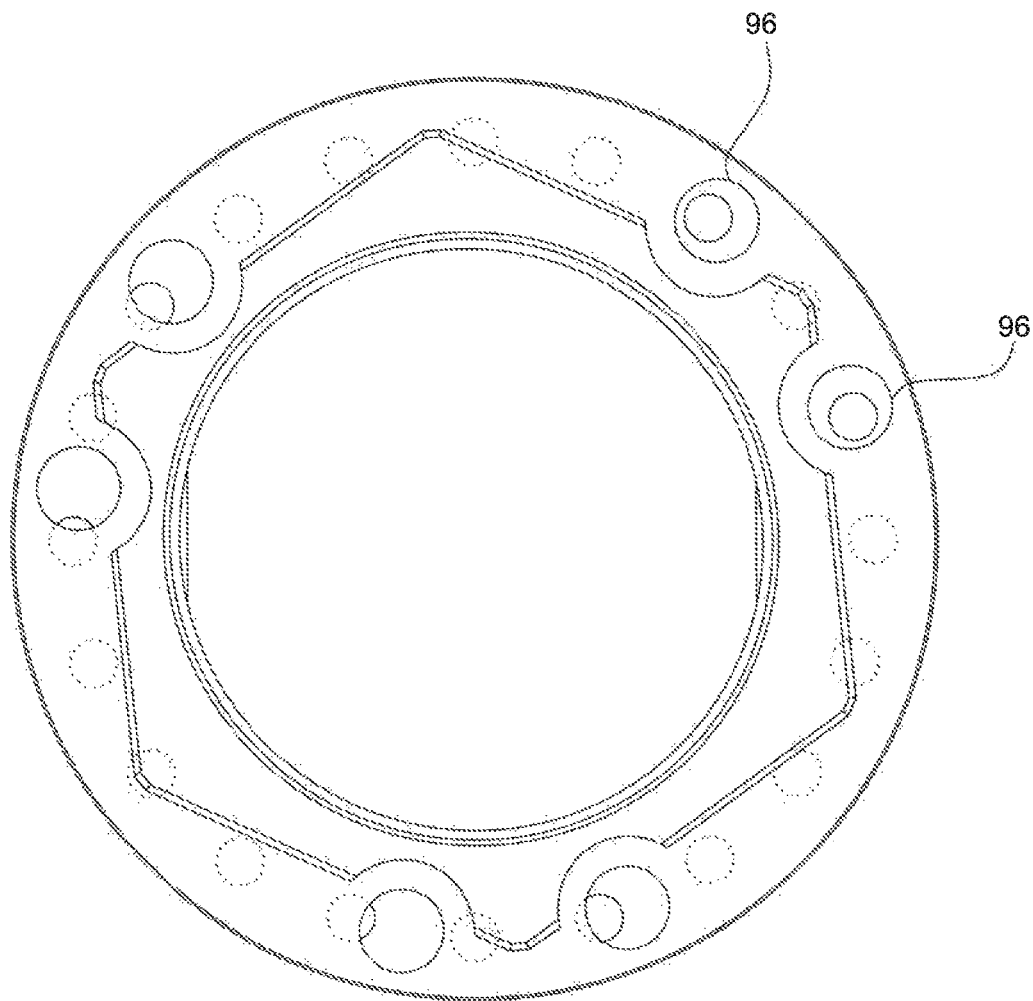
Figure 15:
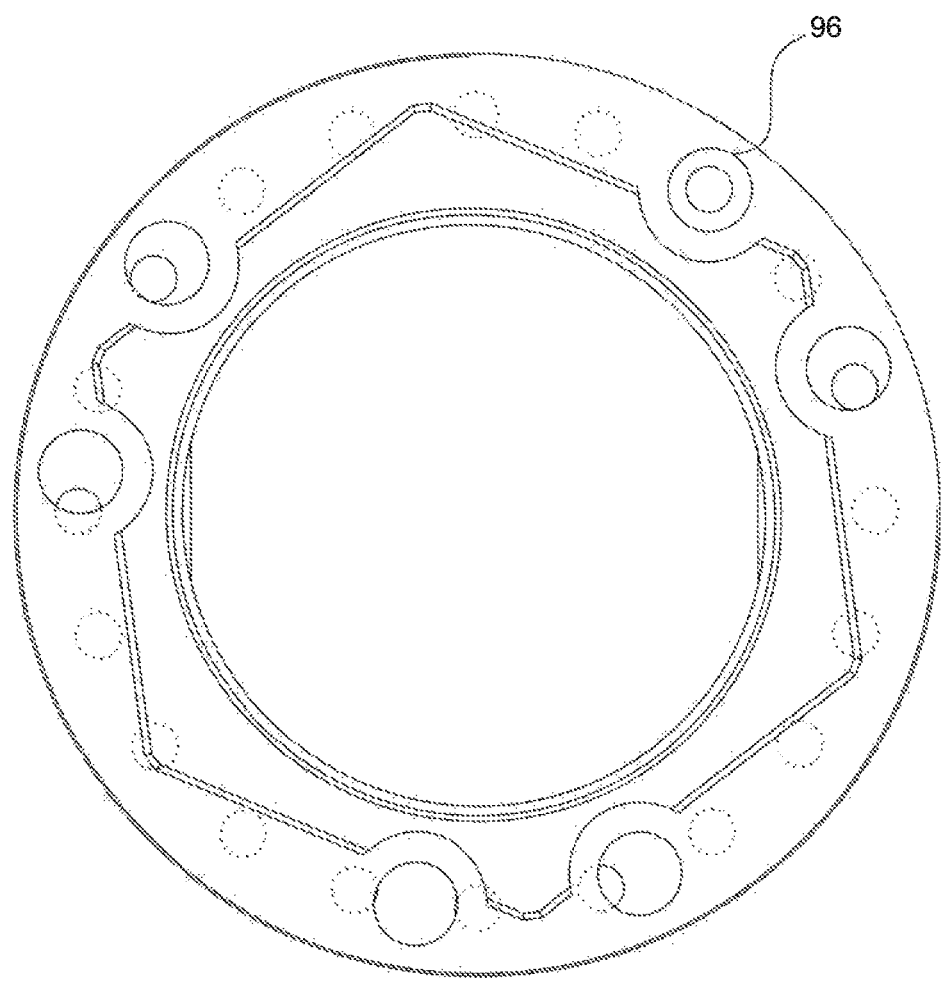
Figure 16:
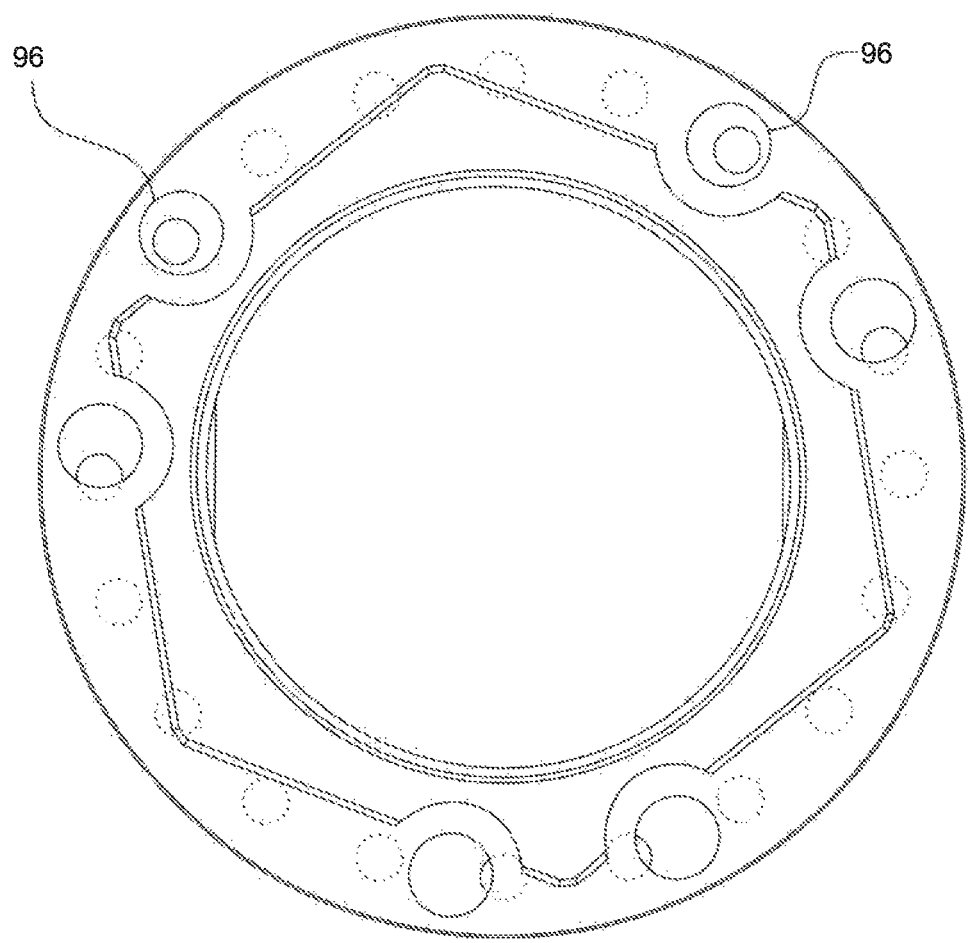
Figure 17:
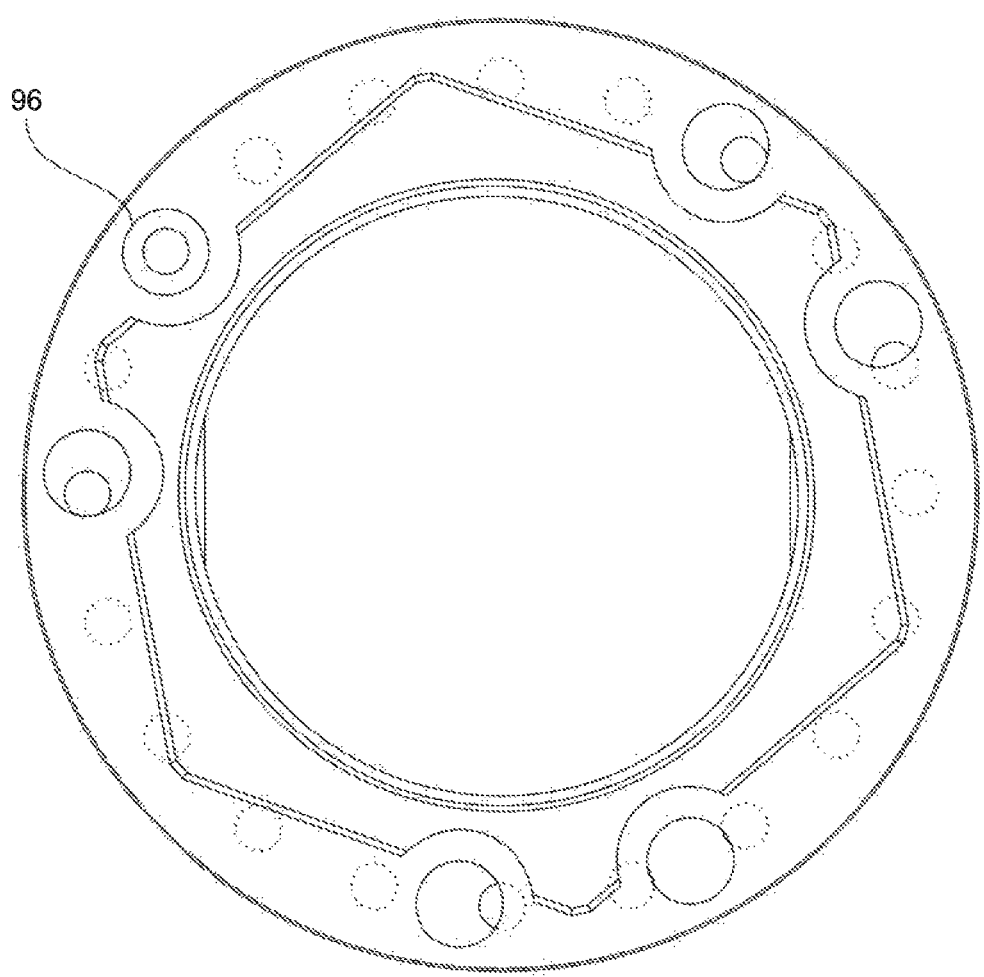
Figure 18:
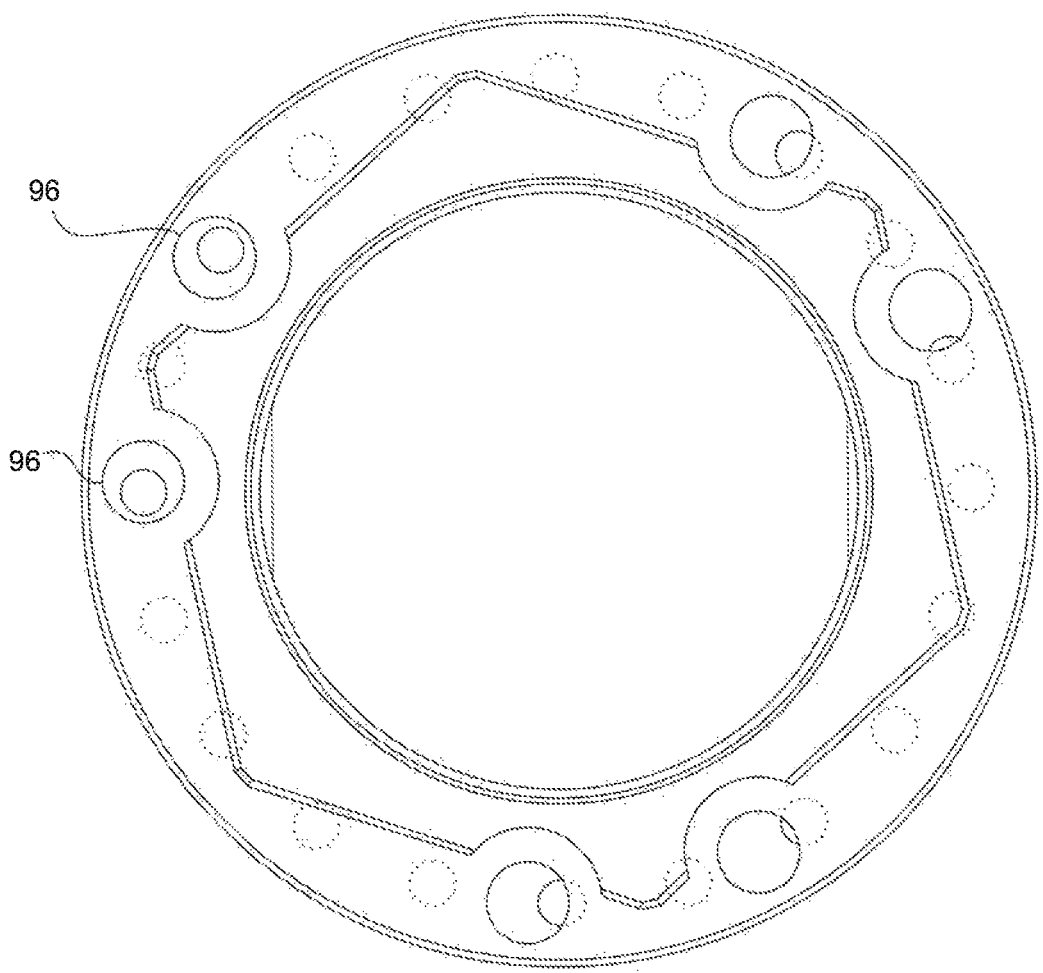
Figure 19:
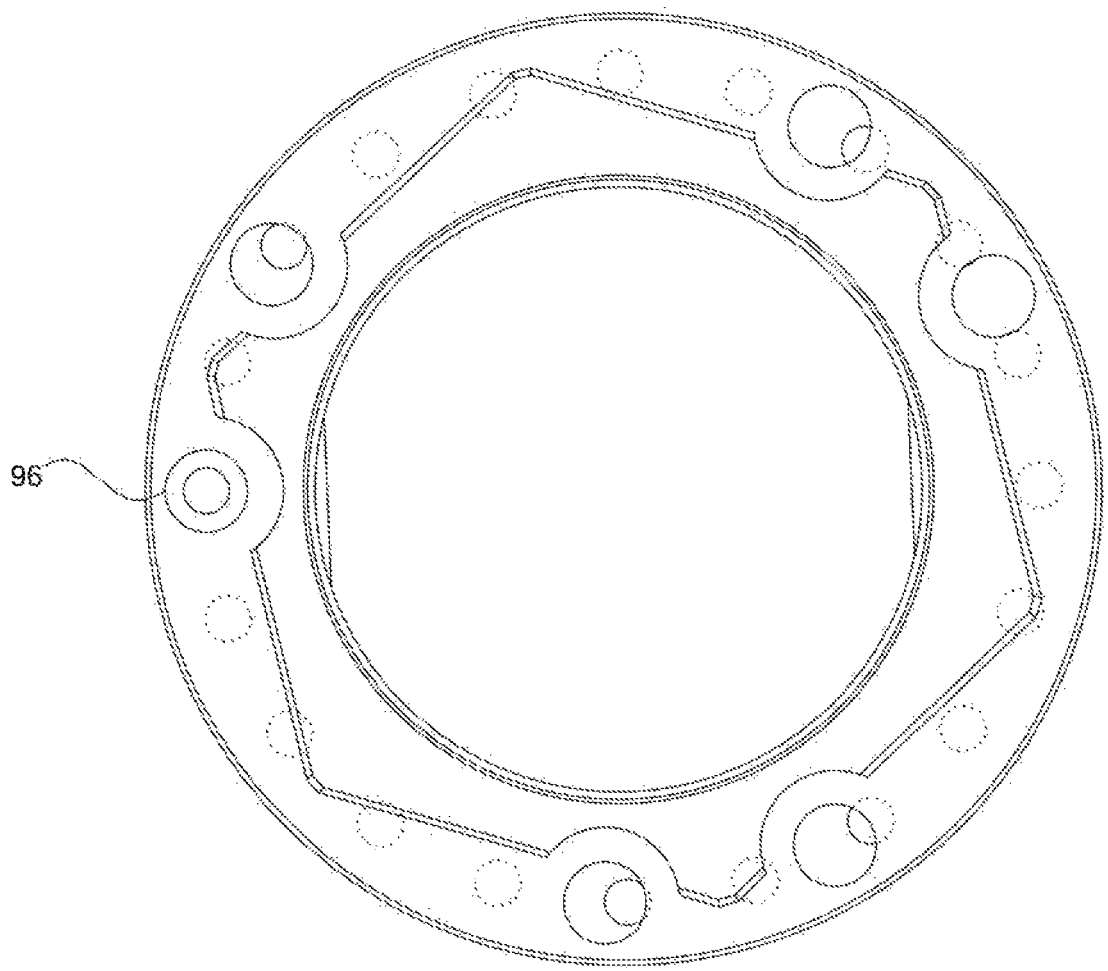
Figure 20:
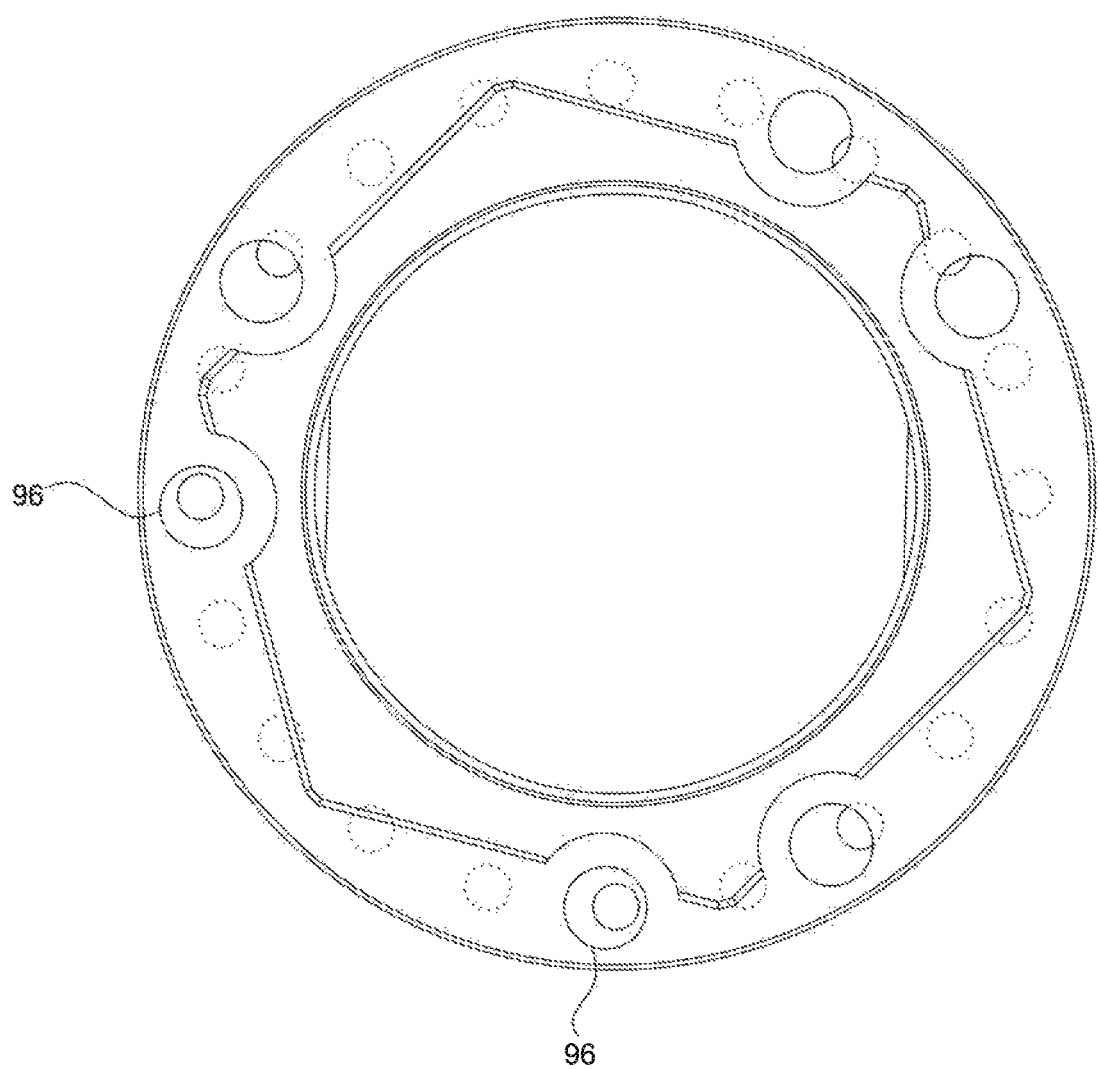
Figure 21:
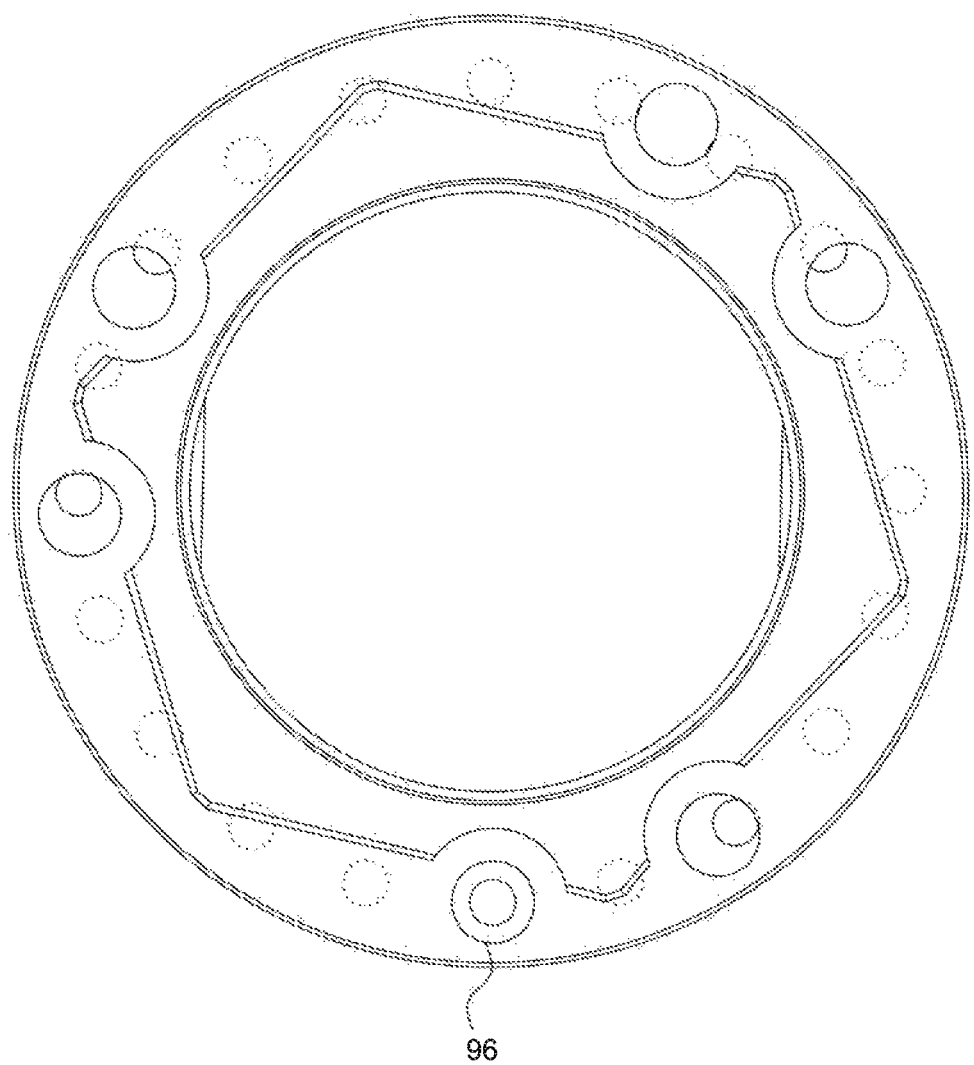
Figure 22:
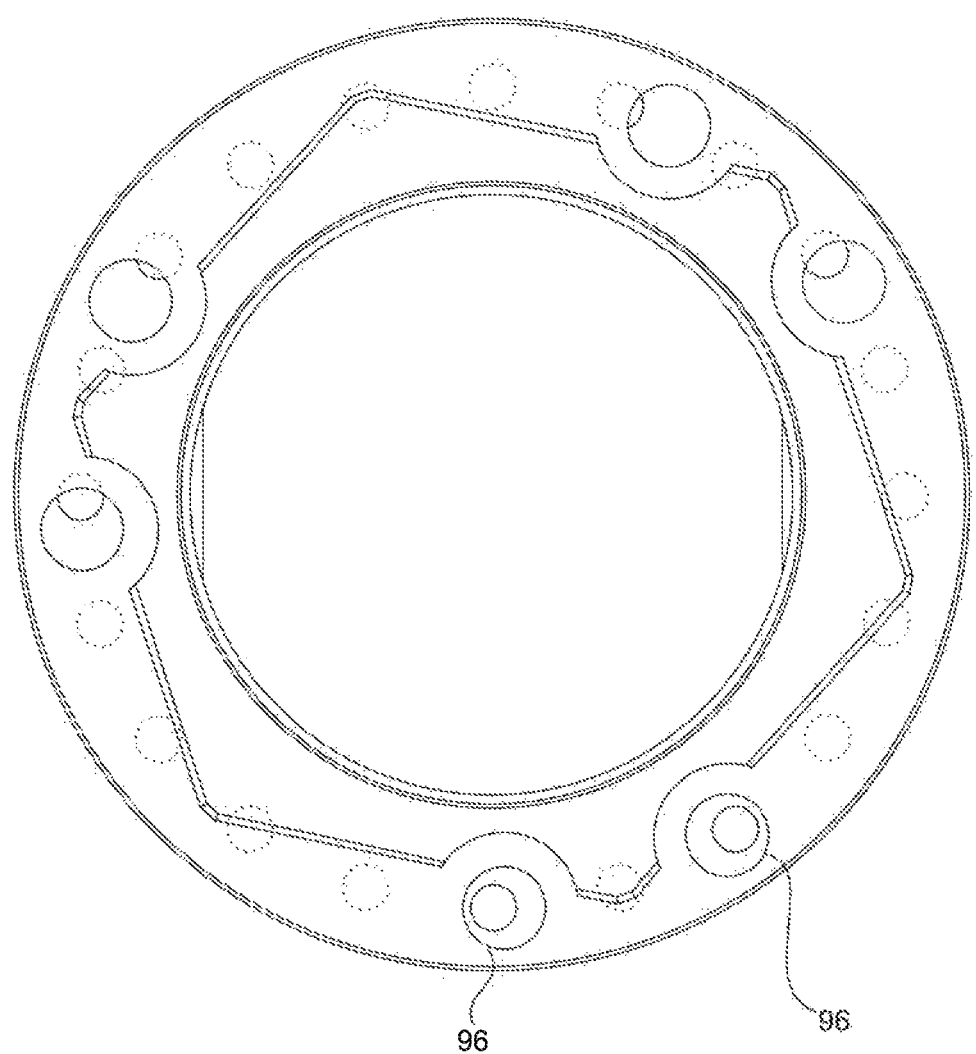

FIGS. 10 through 22 show a progressive movement of the nut 44 relative to the keyed washer 42 in one and a half degrees increments from a reference zero degrees shown in FIG. 10 and a rotation of eighteen degrees shown in FIG. 22. This example nut 44 and keyed washer 42 combination also provides at least one alignment 96 not only at each rotation of one half of the angular variation of the nut 44 relative to the keyed washer 42 but continuously through any amount of rotation of the nut 44 relative to the keyed washer 42. In this example the angular variation is three degrees.

As shown, every three degrees of rotation of the nut 44 (e.g., from zero degrees of rotation shown in FIG. 10 to three degrees of rotation illustrated in FIG. 12) results in two alignments 96 of an aperture 76 and a corresponding aperture 50. Every intermediate one and a half degrees of rotation (e.g., from zero degrees of rotation shown in FIG. 10 to one and half degrees of rotation shown in FIG. 11) results in a single alignment 96 of an aperture 76 and corresponding aperture 50. Thus, every one and a half degrees of rotation of the nut 44 relative to the keyed washer 42 alternates between two alignments 96 and a single alignment 96. As also illustrated, the single alignments 96 have the centerline of the aperture 76 aligned with the centerline of the aperture 50. Where dual alignments 96 are illustrated, the centerline of each aperture 76 does not align with the corresponding centerline of the aperture 50. The nut 44 also includes six raised points 98 forming a uniform pattern to facilitate tightening of the nut 44 onto a stud, such as stud 32 shown in FIG. 2. Thus, every one and a half degrees of rotation of the nut 44 relative to the keyed washer 42 results in at least one corresponding pair of an aperture 76 and aperture 50 aligning to accept a fastener, such as fastener 48 also shown in FIG. 3. Moreover, an alignment between an aperture 76 and aperture 50 also exists in-between these discrete rotations of one half of the angular variation. As a consequence, an alignment between at least one aperture 76 and aperture 50 is continuously present during rotation of the nut 44 relative to the keyed washer 42.

Figure 23:
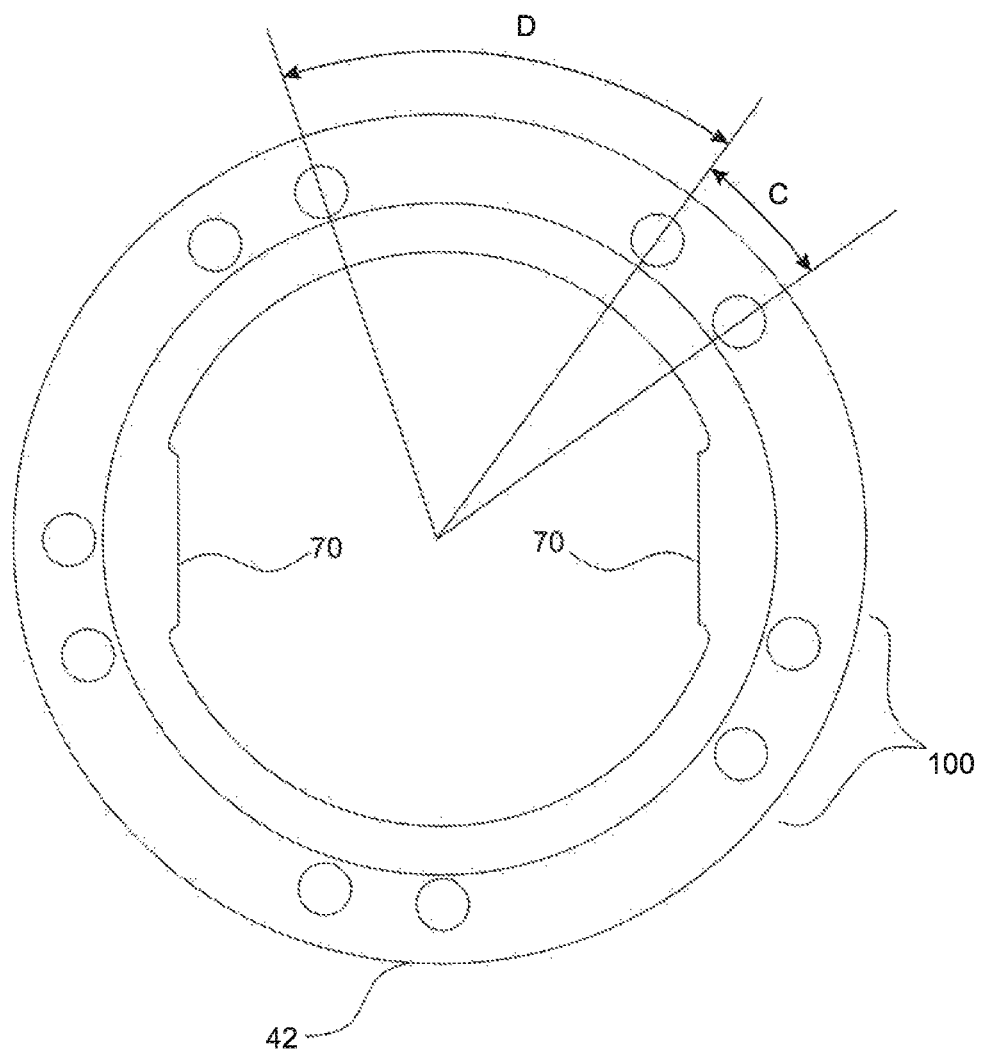
FIG. 23 shows another example keyed washer.

FIG. 23 shows another example keyed washer 42. This example keyed washer 42 includes ten apertures 50 clustered into five different groups 100. A nut, such as the nut 44 shown in FIGS. 7 through 9, may be used in combination with the keyed washer 42 shown in FIG. 23 and successfully provide an alignment between an aperture formed in the keyed washer 42 and an aperture formed in the nut 44 is continuously present as the nut 44 is rotated relative to the keyed washer 42. In this example, the angular variation is three degrees. The keyed washer 42 shown in FIG. 23 may be described as a keyed washer having 20 uniformly distributed apertures about a circumference of the keyed washer with every other pair of apertures removed. Thus, an angular spacing C between adjacent apertures 50 within a group 100 is 18°. An angle D formed between adjacent apertures 50 of adjacent groups 100 is 54°.

Figure 26:
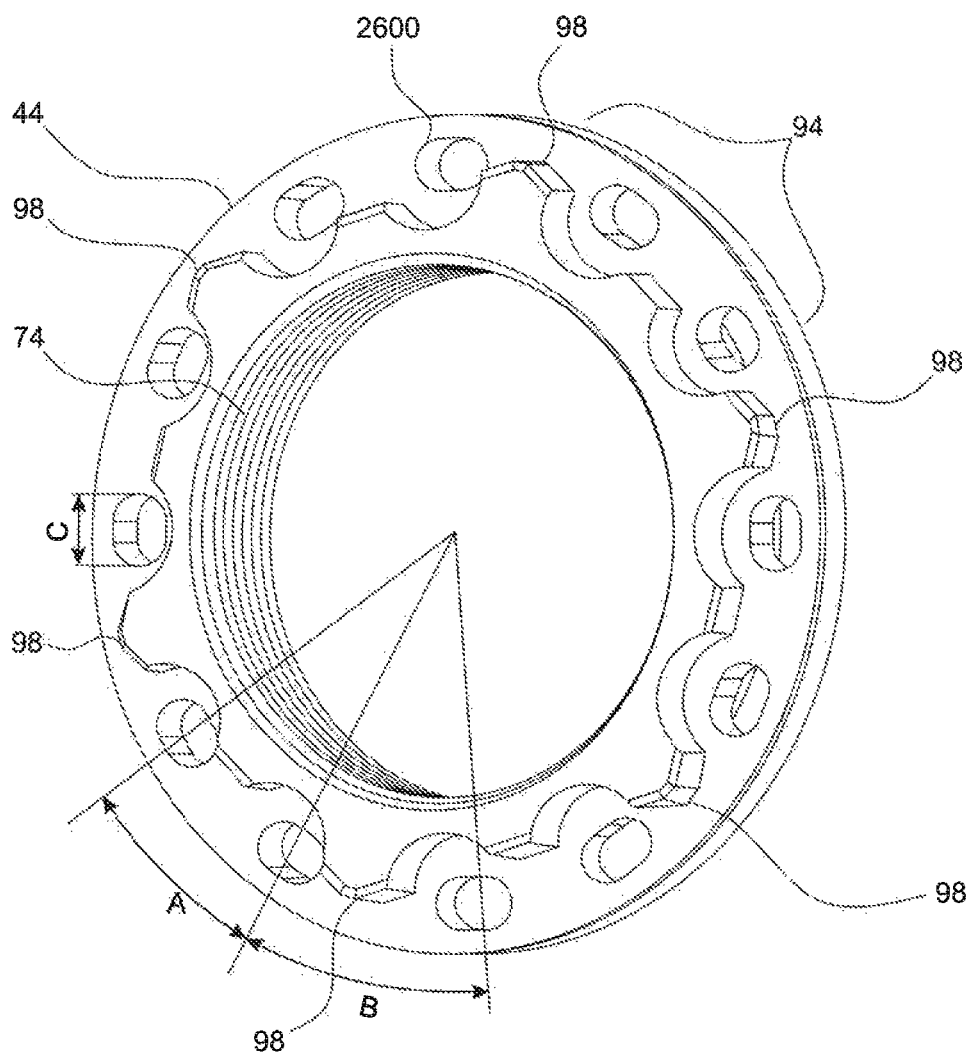
FIG. 26 shows an example nut with a plurality of elongated apertures.

While the example nuts so far described have included circular apertures, the scope of the disclosure is not so limited. Rather, in other implementations, the nut may include one or more arc-shaped or elongated apertures. For example, nut 44 illustrated in FIG. 26 includes a plurality of elongated apertures 2600. Particularly, the nut 44 shown in FIG. 26 includes twelve elongated apertures 2600 divided into six groups 94. An angular spacing A between the apertures 76 is 27°; an angular spacing B between adjacent groups 94 of apertures 76 is 33°; and a length C of aperture 76 is 0.172 inches. The elongated apertures 2600 may serve the same function as the circular apertures described above. That is, the elongated apertures permit alignment of the elongated apertures 2600 with corresponding apertures formed in an adjacent keyed washer over a selected angular variation. The nut 2600 also includes an inner threaded surface 74 and six raised points 98.

Figure 27:
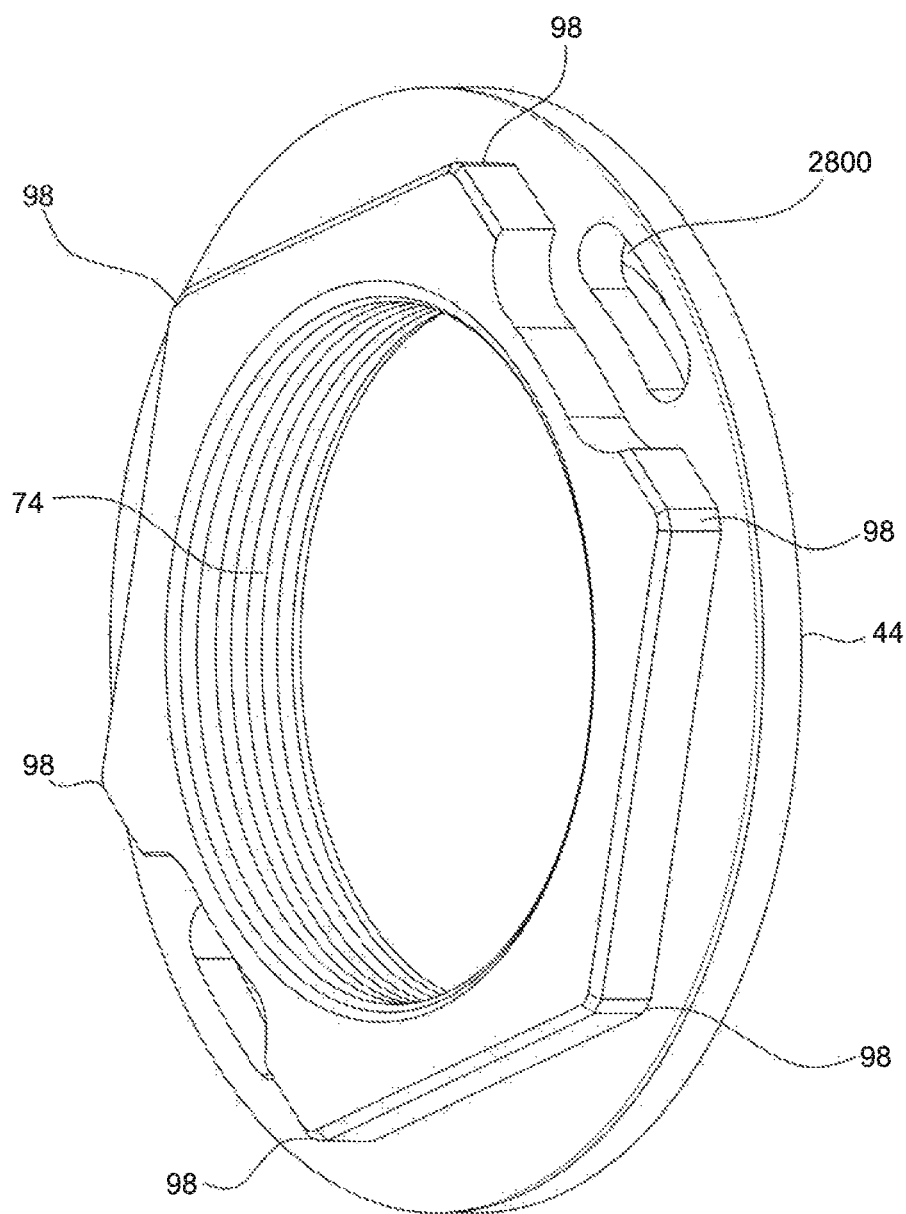
FIGS. 27-28 show another example nut with two elongated apertures.
Figure 28:
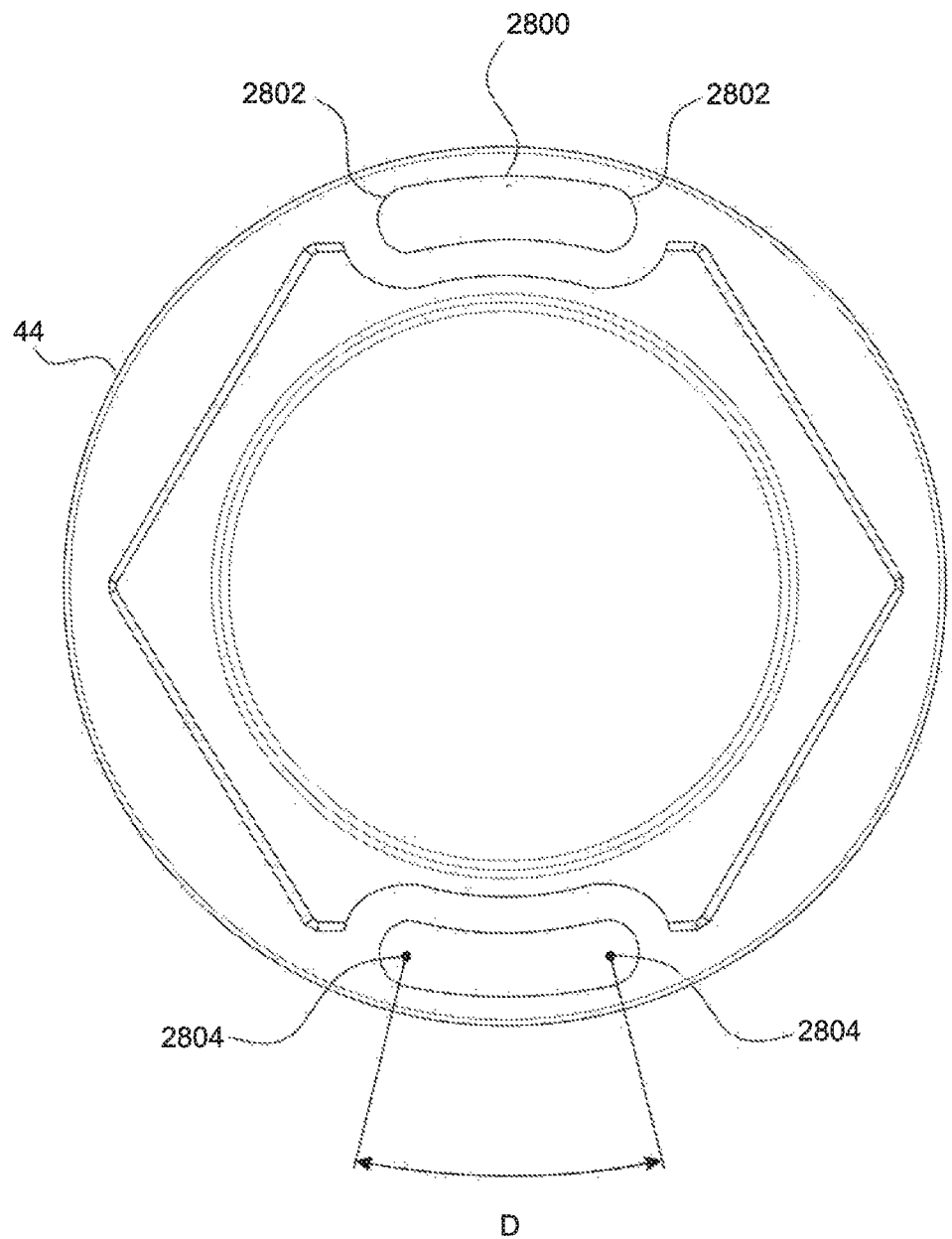
Figure 29:
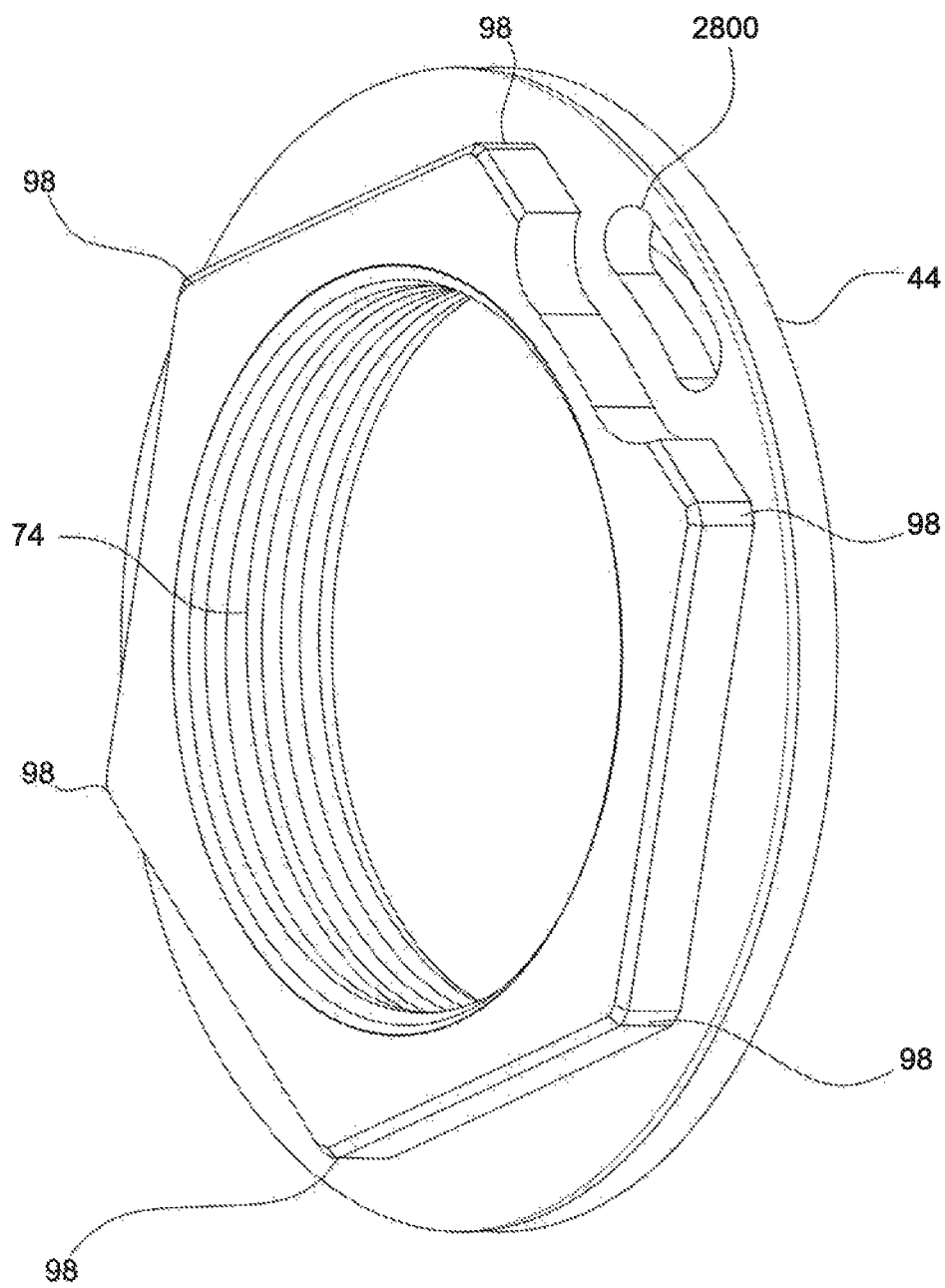
FIG. 29 shows another example nut with a single elongated aperture.

FIGS. 27 and 28 shows a nut 44 with two elongated apertures 2800. In the example illustrated, the aperture 2800 has semicircular ends 2802 having a radius of 0.065 inches. The apertures 2800 extend over an angular amount D of 30° measured from centers 2804 of the semicircular ends 2802. FIG. 29 shows a nut 44 with a single elongated aperture 2800. Each of the nuts 44 shown in FIGS. 28 and 29 have six raised points 98 and an inner threaded surface 74.

Figure 30:
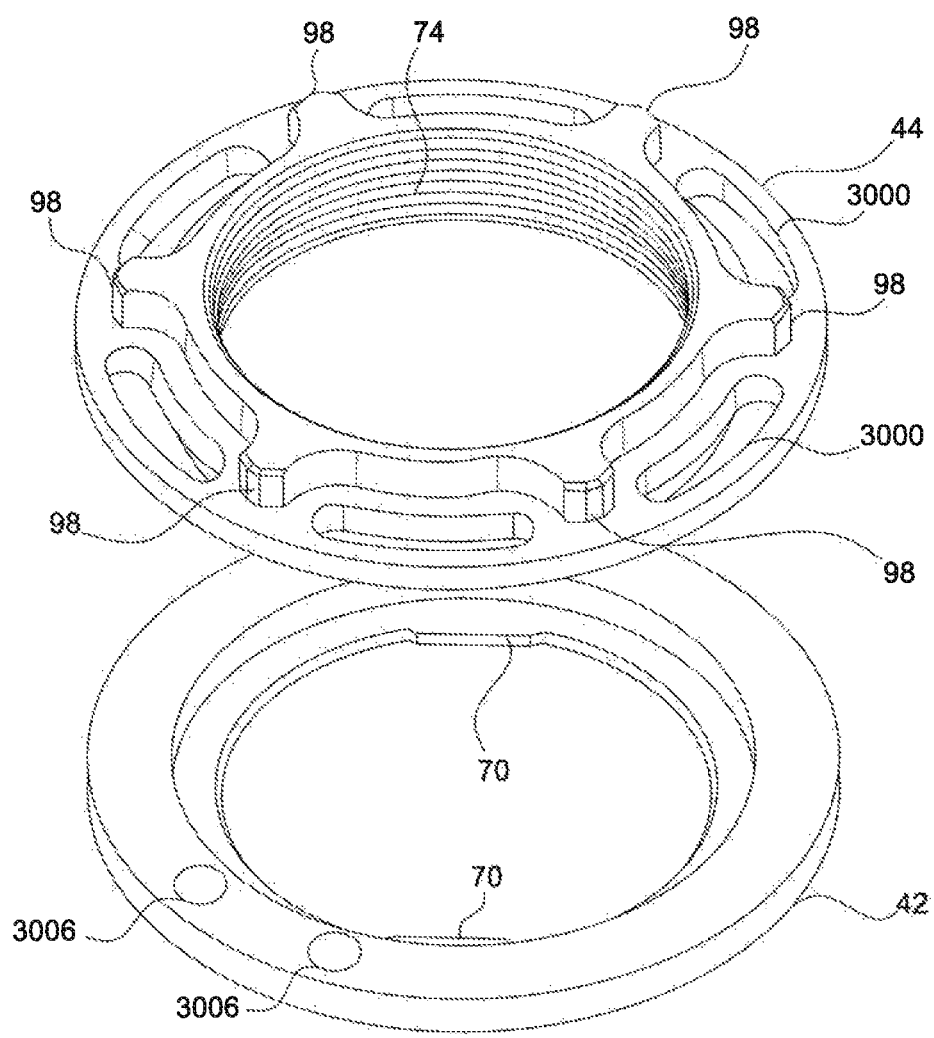
FIGS. 30 and 31 show another example nut and keyed washer combination in which the nut includes six elongated apertures and the keyed washer with two threaded apertures.
Figure 31:
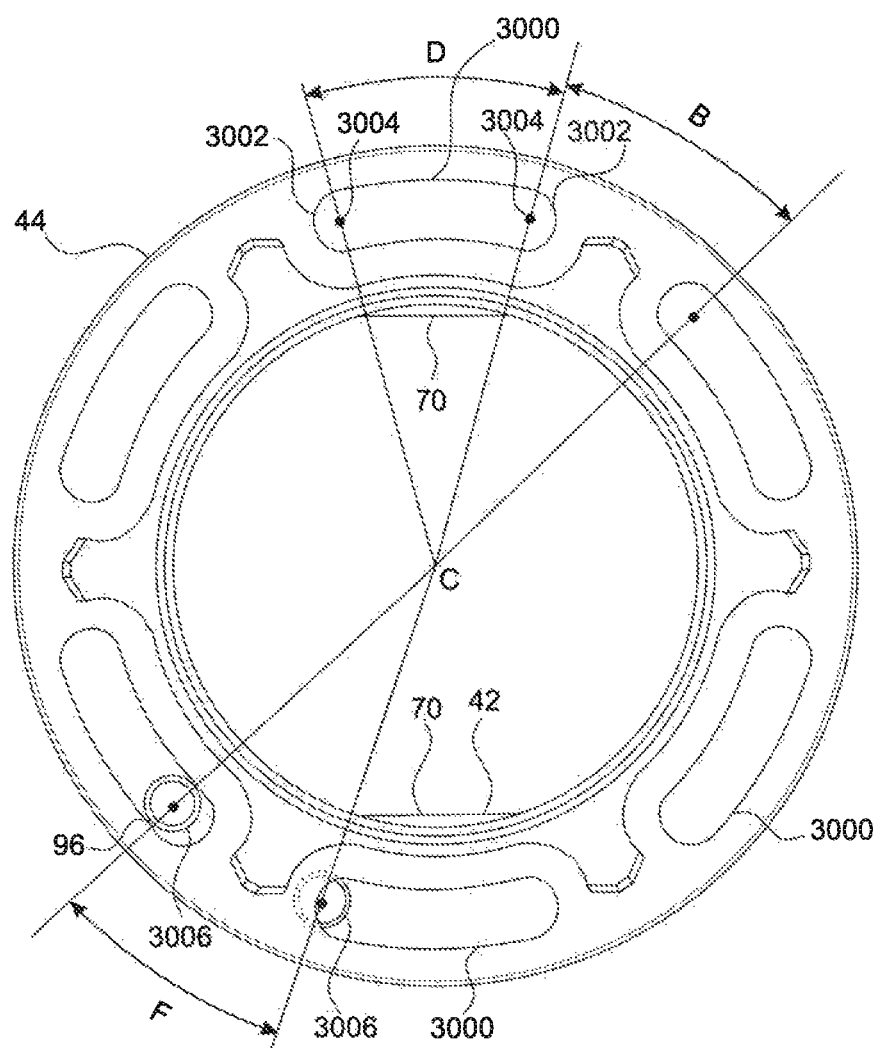

FIGS. 30 and 31 show another example in which a nut 44 includes six elongated apertures 3000 and a keyed washer 42 with two threaded apertures 3006. In the illustrated example, the aperture 3000 has semicircular ends 3002 having a radius of 0.065 inches. The apertures 3000 extend over an angular amount D of 30° measured from centers 3004 of the semicircular ends 3002. Adjacent apertures 3000 have an angular spacing B of 30°. In the illustrated example, the keyed washer 42 includes two apertures 50 that have an angular offset F of 30°. As shown in FIG. 31, at least one alignment 96 between an elongate aperture 3000 and a corresponding aperture 3006 is assured throughout rotation of the nut 44 relative to the keyed washer 42. Because the angular spacing B and angular offset F are both 30°, it is possible for both apertures 3006 to be aligned with a single elongated aperture 3000.

Figure 32:
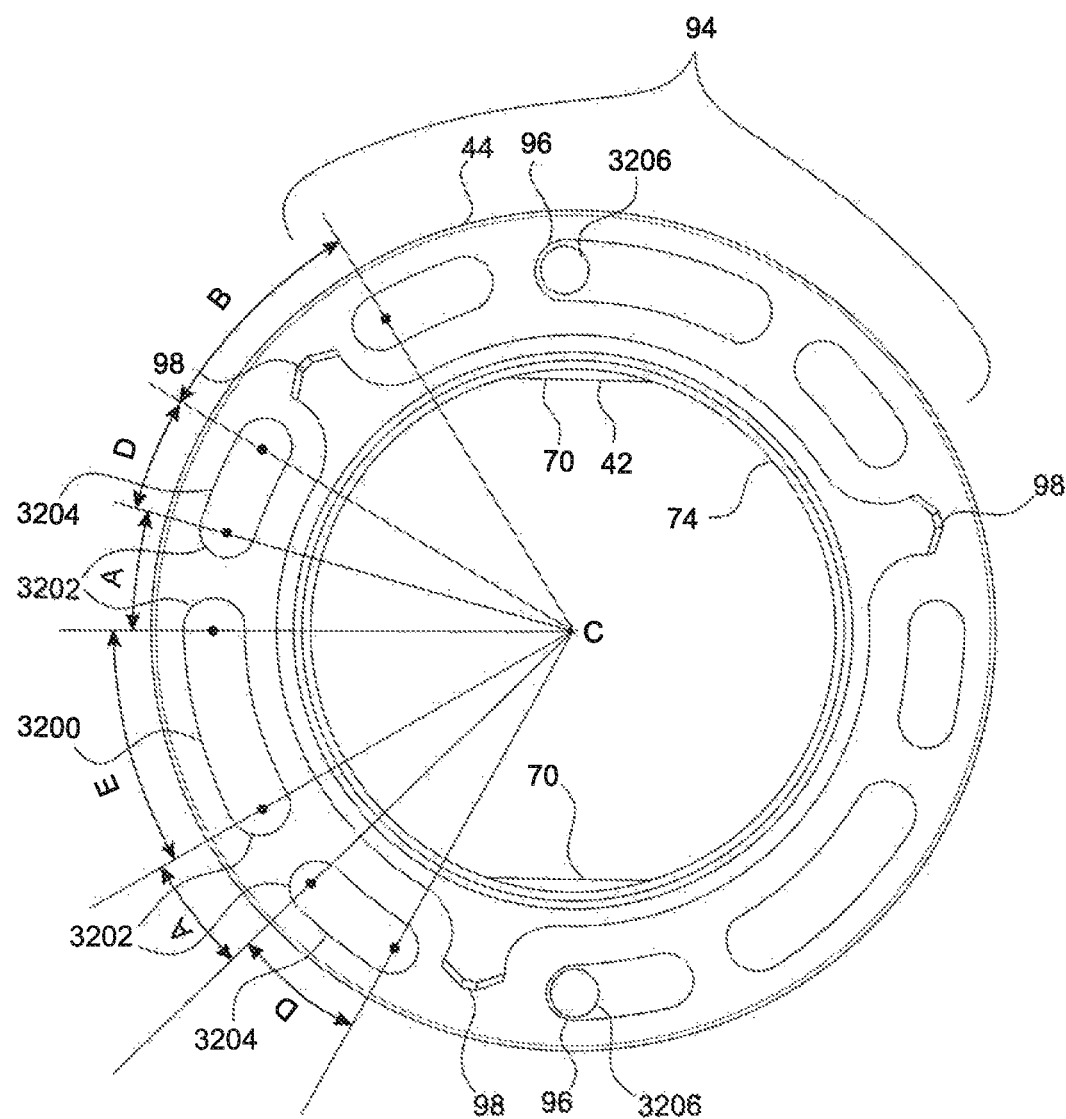
FIGS. 32 and 33 illustrate another example nut and keyed washer combination in which the nut includes elongated apertures of different sizes.
Figure 33:
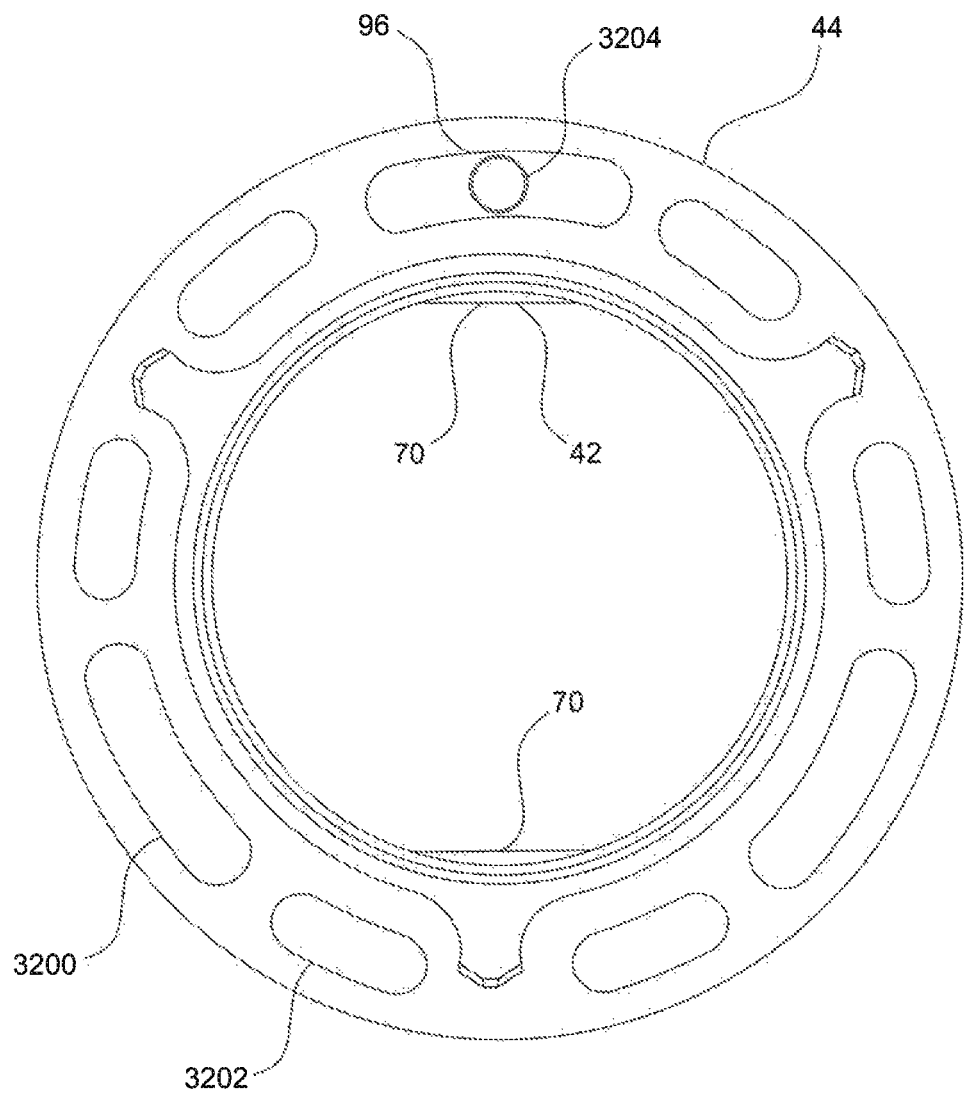

FIGS. 32 and 33 show yet another example nut 44 and keyed washer 42. In this example, the nut 44 includes three groups 94 of elongated apertures of varying size. In this example, each group 94 includes three elongated apertures with a central aperture 3200 extending over a larger angular range than two flanking elongated apertures 3204. Both the apertures 3200 and 3204 include semicircular ends 3202. Within a group 94, the aperture 3200 extends over an angular amount E of 30°, the apertures 3204 extend over an angular amount D of 15°, and an angular separation A between apertures 3200 and 3204 is 15°. An angular separation B between groups 94 is 30°. The nut 44 also includes three raised points 98 and includes an inner threaded surface 74. The keyed washer 42 includes two threaded apertures 3204 that are offset along a circumference of the keyed washer by 180°. With a selected angular variation of three degrees, for every one and a half degree of rotation of the nut 44 relative to the keyed washer 42, at least one alignment 96 between an elongated aperture formed in the nut 44 (e.g., apertures 3200, 3202) and an aperture 3104 formed in the keyed washer 42 exists. At some increments of angular rotation of the nut 44 relative to the keyed washer, two alignments 96 exist. FIG. 31 shows two alignments 96, while FIG. 32 shows a single alignment 30.

Figure 34:
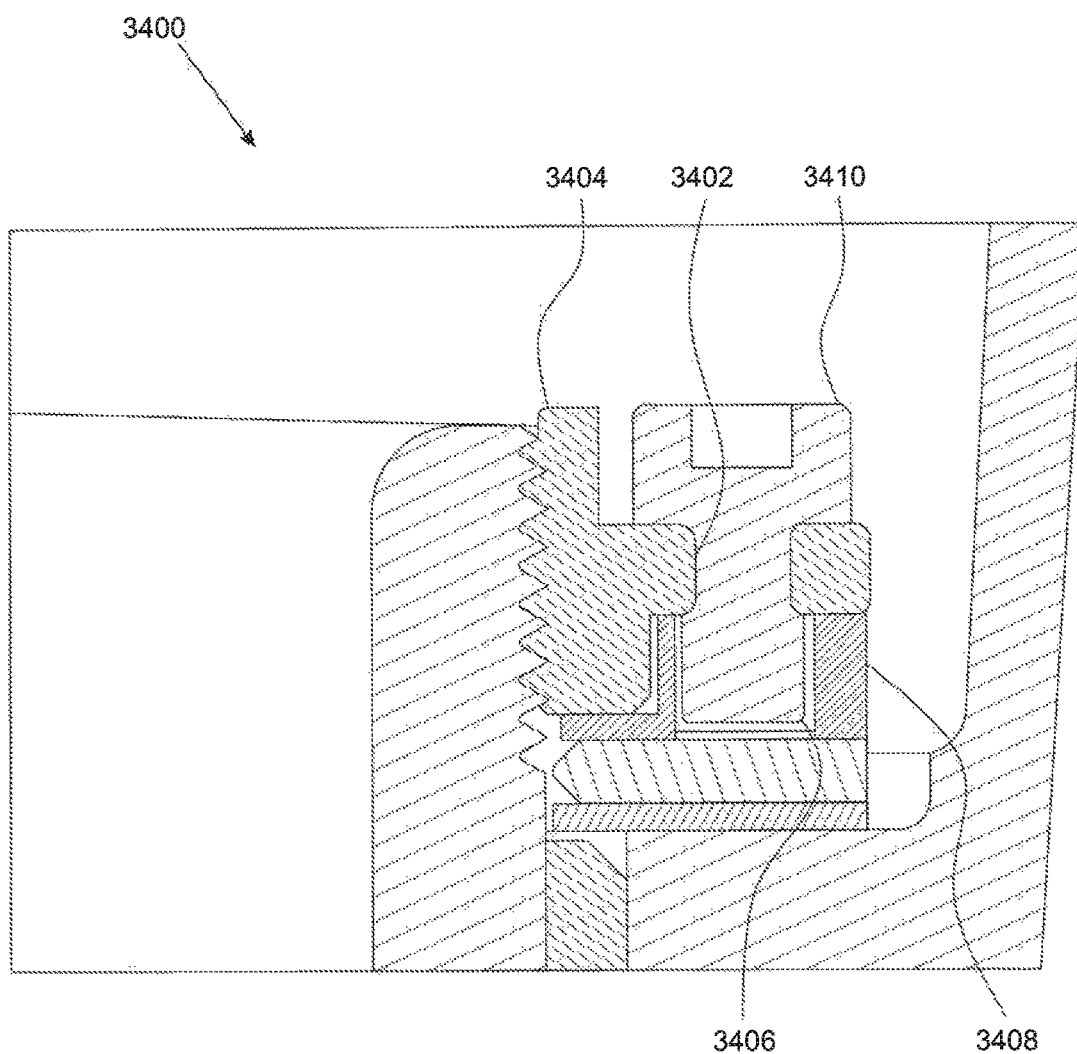
FIG. 34 shows a portion of an example pivoting mechanism with a threaded surface formed in an aperture of the nut for engaging with a threaded surface of a fastener.

FIG. 34 shows a portion of another example pivoting mechanism 3400 that is similar to pivoting mechanism 25. The pivoting mechanism 3400 may be the same as the pivoting mechanism 25 except that apertures 3402 formed in nut 3404 may be threaded, and apertures 3406 formed in keyed washer 3408 are not threaded. A fastener 3410 threadingly engages the threaded aperture 3402 and extends into the aligned aperture 3406 formed in the keyed washer 3408, interlocking the nut 3404 and the keyed washer 3408 together.

Persons of ordinary skill in the art will appreciate that the examples encompassed by the present disclosure are not limited to the particular implementations described above. In that regard, although illustrative implementations have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An articulating mechanism comprising:
   a stud comprising a shaft that includes a threaded portion;
   a keyed washer comprising a plurality of threaded apertures, each of the plurality of threaded apertures of the keyed washer having a first size; and
   a nut comprising:
      an inner threaded surface adapted to threadingly engage the threaded portion of the shaft of the stud;
      a plurality of apertures segregated into a plurality of groups, each of the plurality of apertures having a second size larger than the first size, and apertures of the plurality of apertures within each group being separated by a first angular offset and adjacent groups of the plurality of apertures being separated by a second angular offset, the first angular offset being different than the second angular offset; and
   a fastener threadably receivable into any of the plurality of threaded apertures of the keyed washer that is aligned with an aperture of the plurality of apertures of the nut;
   wherein an angular variation is defined by an amount of angular rotation of the nut relative to the keyed washer that causes a first centerline of a first aperture of the plurality of apertures of the nut to move with respect to a second centerline of a first threaded aperture of the plurality of threaded apertures of the keyed washer while the first aperture and first threaded aperture are aligned such that the fastener may be threadably received into the first threaded aperture.

2. The articulating mechanism of claim 1, wherein rotation of the nut relative to the keyed washer by an angular amount that is one half of the angular variation causes at least one of the plurality of apertures of the nut to align with a corresponding threaded aperture of the plurality of threaded apertures of the washer.

3. The articulating mechanism of claim 1, wherein the stud further comprises a first flat surface formed on the stud and wherein the keyed washer comprises a second flat surface that cooperates with the first flat surface to prevent the keyed washer from rotating on the shaft of the stud.

4. The articulating mechanism of claim 1, wherein the nut further comprises a plurality of raised points.

5. The articulating mechanism of claim 4, wherein the plurality of raised points conform to a hexagonal relationship.

6. The articulating mechanism of claim 1, wherein the angular variation is three degrees, wherein the first angular offset is 21 degrees, and wherein the second angular offset is 36 degrees.

7. The articulating mechanism of claim 1, wherein the angular variation is three degrees, wherein the first angular offset is 27 degrees, and wherein the second angular offset is 33 degrees.

8. The articulating mechanism of claim 1, wherein the first size is 0.172 inches and wherein the second size corresponds to an M3×0.5 bolt.

9. An articulated mounting arm comprising:
a first arm;
a second arm pivotably connected to the first arm at a joint, the second arm comprising a housing flange; and
a pivoting mechanism formed in the joint, the pivoting mechanism comprising:
  a stud connected to the first arm, the stud comprising a shaft that includes a threaded portion, the housing flange received onto the shaft;
  a keyed washer comprising a plurality of threaded apertures, each of the plurality of threaded apertures of the keyed washer having a first size, the keyed washer received onto the shaft of the stud adjacent to the housing flange; and
  a nut comprising:
    an inner threaded surface adapted to threadingly engage the threaded portion of the shaft of the stud;
    a plurality of apertures segregated into a plurality of groups, each of the plurality of apertures having a second size larger than the first size, and apertures of the plurality of apertures within each group being separated by a first angular offset and adjacent groups being separated by a second angular offset, the first angular offset being different than the second angular offset; and
  a fastener threadably receivable into any of the plurality of threaded apertures of the keyed washer that is aligned with an aperture of the plurality of apertures of the nut;
  wherein an angular variation is defined by an amount of angular rotation of the nut relative to the keyed washer that causes a first centerline of a first aperture of the plurality of apertures of the nut to move with respect to a second centerline of a first threaded aperture of the plurality of threaded apertures of the keyed washer while the first aperture and first threaded aperture are aligned such that the fastener may be threadably received into the first threaded aperture.

10. The articulated mounting arm of claim 9, wherein rotation of the nut relative to the keyed washer by an angular amount that is one half of the angular variation causes at least one of the plurality of apertures of the nut to align with a corresponding threaded aperture of the plurality of threaded apertures of the washer.

11. The articulated mounting arm of claim 9, wherein the stud further comprises a first flat surface formed on the stud and wherein the keyed washer comprises a second flat surface that cooperates with the first flat surface to prevent the keyed washer from rotating on the shaft of the stud.

12. The articulating mounting arm of claim 9, further comprising a journal bearing disposed in an annular space formed between an outer surface of the shaft of the stud and an inner surface of the housing flange.

13. The articulating mounting arm of claim 12, wherein the journal bearing is formed from a polymer.

14. The articulating mounting arm of claim 13, wherein the stud further comprises a flange mounted to the first arm, and
further comprising:
  a second thin washer; and
  a second thrust washer abutting the second thin washer, wherein the second thin washer and second thrust washer are disposed on the shaft of the stud between the flange of the stud and the housing flange.

15. The articulating mounting arm of claim 9, further comprising:
a first thin washer; and
a first thrust washer abutting the first thin washer, wherein the first thin washer and first thrust washer are disposed on the shaft of the stud between the keyed washer and the housing flange.

16. The articulating mounting arm of claim 9, wherein the nut further comprises a plurality of raised points.

17. The articulating mounting arm of claim 16, wherein the plurality of raised points conform to a hexagonal relationship.

18. The articulating mounting arm of claim 9, wherein the angular variation is three degrees, wherein the first angular offset is 21 degrees, and wherein the second angular offset is 36 degrees.

19. The articulating mounting arm of claim 9, wherein the angular variation is three degrees, wherein the first angular offset is 27 degrees, and wherein the second angular offset is 33 degrees.

20. The articulating mounting arm of claim 9, wherein the first size is 0.172 inches and wherein the second size corresponds to an M3×0.5 bolt.

21. The articulating mounting arm of claim 9, wherein at least one of the plurality of apertures of the nut forms an elongated aperture.

* * * * *